United States Patent
Walsh et al.

(10) Patent No.: US 12,487,852 B1
(45) Date of Patent: Dec. 2, 2025

(54) METHODS AND SYSTEMS FOR PRIORITIZATION OF GROUP COMPUTING TASKS

(71) Applicant: Parry Labs, LLC, Alexandria, VA (US)

(72) Inventors: David Walsh, Alexandria, VA (US); Charles Adams, Cedar Rapids, IA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/910,914

(22) Filed: Oct. 9, 2024

(51) Int. Cl.
*G06F 9/48* (2006.01)
(52) U.S. Cl.
CPC .................... *G06F 9/4881* (2013.01)
(58) Field of Classification Search
CPC .................................................. G06F 9/4881
See application file for complete search history.

(56) References Cited

U.S. PATENT DOCUMENTS

| | | | | |
|---|---|---|---|---|
| 12,124,573 | B1 * | 10/2024 | Lim | G06F 21/554 |
| 2023/0153191 | A1 * | 5/2023 | Gennetten | G06F 11/0751 |
| | | | | 714/57 |

FOREIGN PATENT DOCUMENTS

CA 3027996 A1 * 6/2018 .......... G06F 9/4881

* cited by examiner

*Primary Examiner* — Wissam Rashid
(74) *Attorney, Agent, or Firm* — Caldwell Intellectual Property Law

(57) ABSTRACT

A system for prioritization of group computing tasks is described. The system includes at least a processor and a memory communicatively connected to the at least a processor. The memory contains instructions configuring the at least a processor to detect a plurality of active nodes communicatively connected in a group computing environment and receive a plurality of computing tasks associated with the plurality of active nodes for execution in the group computing environment. The at least a processor is also configured to determine a computing demand associated with each of the plurality of computing tasks on the group computing environment and establish a priority for the plurality of computing tasks as a function of the computing demand associated with each of the plurality of computing tasks.

20 Claims, 10 Drawing Sheets

METHODS AND SYSTEMS FOR PRIORITIZATION OF GROUP COMPUTING TASKS

FIELD OF THE INVENTION

The present invention generally relates to the field of group computing. In particular, the present invention is directed to methods and systems for prioritization of group computing tasks.

BACKGROUND

Often times, computing environments with limited resources may not provide sufficient computing resources to effectively prioritize and complete computing tasks. In these situations, these tasks may have different considerations which may affect a necessary priority for tasks

SUMMARY OF THE DISCLOSURE

In one aspect, a system for prioritization of group computing tasks is described. The system includes at least a processor and a memory communicatively connected to the at least a processor. The memory contains instructions configuring the at least a processor to detect a plurality of active nodes communicatively connected in a group computing environment and receive a plurality of computing tasks associated with the plurality of active nodes for execution in the group computing environment. The at least a processor is also configured to determine a computing demand associated with each of the plurality of computing tasks on the group computing environment and generate priority data for the plurality of computing tasks as a function of the computing demand associated with each of the plurality of computing tasks.

In another aspect, a method for prioritization of group computing tasks is described. The method includes detecting, by at least a processor, a plurality of active nodes communicatively connected in a group computing environment and receiving, by the at least a processor, a plurality of computing tasks associated with the plurality of active nodes for execution in the group computing environment. The method also includes determining, by the at least a processor, a computing demand associated with each of the plurality of computing tasks on the group computing environment and generating, by the at least a processor, priority data for the plurality of computing tasks as a function of the computing demand associated with each of the plurality of computing tasks.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
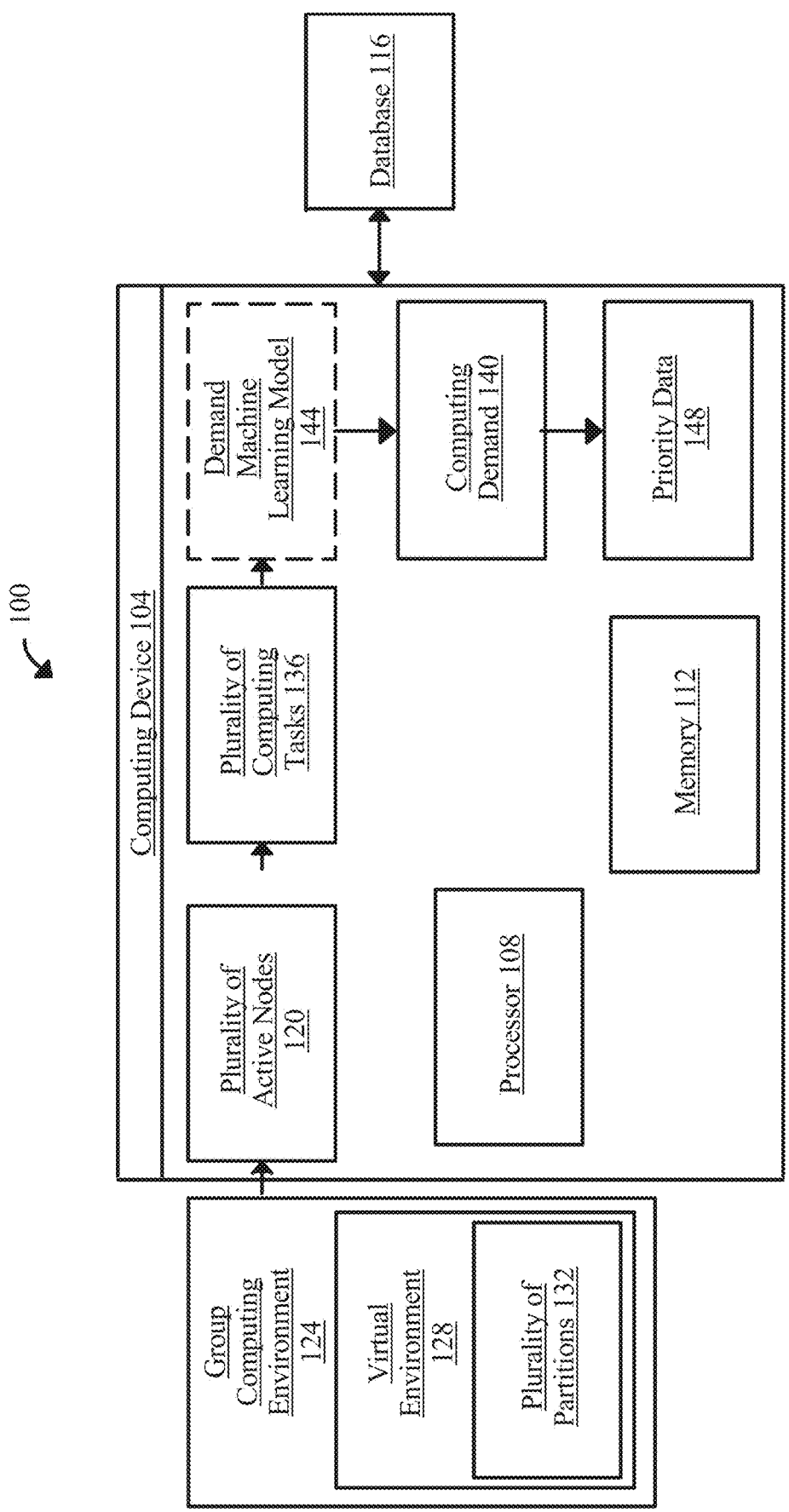
FIG. 1 is a block diagram illustration an exemplary embodiment of a system for prioritization of group computing tasks.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for prioritization of group computing tasks. In an embodiment, system includes at least a processor and a memory communicatively connected to the at least a processor. The memory contains instructions configuring the at least a processor to detect a plurality of active nodes communicatively connected in a group computing environment and receive a plurality of computing tasks associated with the plurality of active nodes for execution in the group computing environment. The at least a processor is also configured to determine a computing demand associated with each of the plurality of computing tasks on the group computing environment and generate priority data for the plurality of computing tasks as a function of the computing demand associated with each of the plurality of computing tasks.

Aspects of the present disclosure can be used for effective management of computational resources. In one or more embodiments, aspects of the current disclosure enable control of priority of tasks to be performed by a group computing system according to such goals as mission criticality, computer security, tasks of individual devices, and the like. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption". Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic systems may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Referring now to FIG. 1, a system 100 for network path generation is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit may be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication.

In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, system 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or more embodiments, host circuit may carry out one or more processes as described in this disclosure intended for computing device 104.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, processor 108 is configured to detect a plurality of active nodes 120 communicatively connected in a group computing environment. An "active node" for the purposes of this disclosure refers to a device or a network that participates in a group computing environment 124. As used herein, "group computing environment" is a computing structure that is able to combine computing resources for communicatively connected nodes. Group computing environment 124 may be useful to increase computation efficiency by allowing a plurality of active nodes to break complex computational task into smaller computational tasks and allow the plurality of active nodes to work on smaller computational tasks at the same time as other smaller computational tasks. Additionally, group computing environment 124 may be useful for versatility of computing power. For example, group computing environment 124 may allow for computational power to be accessed across an entire network of nodes rather than computational power within a specified location. In one or more embodiments, group computing environment 124 may include any group computing environment as described in U.S. Nonprovisional application Ser. No. 18/910,794 filed on Oct. 9, 2024, entitled "APPARATUS AND METHOD FOR PERFORMING GROUP COMPUTING IN A SAFETY-CRITICAL OPERATING ENVIRONMENT (SCOE)", and U.S. Nonprovisional application Ser. No. 18/910,563, filed on Oct. 9, 2024, entitled "APPARATUS AND METHOD FOR ASSIGNING GROUP COMPUTATIONAL TASKS IN A SAFETY-CRITICAL ENVIRONMENT", the entirety of which are incorporated herein by reference.

With continued reference to FIG. 1, group computing environment 124 may include a hardware allocation. For the purposes of this disclosure, "hardware allocation" is a physical computational resource or a group of physical computational resources configured and designated to handle a computational task element. Hardware allocation may include, without limitation, an allocation of CPU, GPU, memory including RAM, storage, network bandwidth, and/or I/O resources, among others, consistent with details described above. Hardware allocation may be localized in a single computing device, such as computing device 104. Hardware allocation may be distributed across a group of computing devices, such as between computing device 104 and at least a secondary computing device communicatively connected thereto. In one or more embodiments, hardware allocation may include determining a first hardware allocation within computing device 104 and determining at least a second hardware allocation within at least a secondary computing device. First hardware allocation and at least a second hardware allocation may then be combined as hardware allocation 136. Additional details will be provided below in this disclosure.

With continued reference to FIG. 1, group computing environment 124 may include a virtual environment 128 using at least a secondary computing device, as a function of hardware allocation. For the purposes of this disclosure, a "virtual environment" is an isolated environment that simulates hardware or an operating system, allowing multiple applications or tasks to run independently on the same physical infrastructure. A virtual environment 128 may abstract the underlying physical resources, such as without limitation CPU, memory, storage, and network, among others, and provide a controlled space where applications, processes, or entire operating systems can be deployed and executed without interference. A virtual environment 128 may allow for the isolation of one or more software from a host operating system (host OS). Host OS may include a primary operating system installed on the hardware of a computing device, such as, without limitation, a secondary computing device. In some cases, host OS may manage underlaying physical resources and facilitate the running of one or more guest operating systems (guest OS). As a nonlimiting example, a Linux operating system running on a computing device as the primary operating system may be the host OS. Software applications integrated to a computing device may accordingly be run atop the Linux operating system. In some cases, a virtual environment 128 may be software-defined. As a nonlimiting example, a virtual environment 128 may include a simulated operating system that operates independently of the underlaying physical hardware of a computing device. In some cases, a virtual environment 128 may emulate one or more hardware, software, networks, and/or a combination thereof.

With continued reference to FIG. 1, in one or more embodiments, virtual environment 128 may include a plurality of partitions 132. For the purposes of this disclosure, a "partition" is a subdivision of computational resources used to create an isolated environment. The resource may include storage, memory, processing power, or any other resource, as recognized by a person of ordinary skill in the art, upon reviewing the entirety of this disclosure. In one or more embodiments, processes or tasks running in one partition may not interfere with those running in another. In some cases, a partition may include memory partition (i.e., a section of a computer's RAM or storage), processor partition (i.e., a set of processor resources or cores), hardware partition (i.e., physical subdivision of a computing device into smaller units), logical partition (i.e., a virtualization of a separate computer), or any combinations thereof. Plurality of partitions 132 may include a first partition and at least a second partition. In some cases, plurality of partitions 132 may further include a third partition, a fourth partition, . . . , an Nth partition. For the purposes of this disclosure, a "first partition" is a partition of a plurality of partitions 132. In some cases, a first partition may include a boot partition from which an operating system loads or boots up. In some cases, a first partition may include a primary memory partition, wherein the initial memory is allocated for a software to load, as described in further detail below. In some cases, a first partition may include a main processing partition. As a nonlimiting example, a first partition may be responsible for primary tasks such as without limitation system management, control tasks, and/or the like, as described herein. For the purposes of this disclosure, a "second partition" is a separate, distinct operating space within virtual environment 128 that is distinct from a first partition, as described above. It is worth noting that the designation of first partition and second partition may be arbitrary and a matter of perspective. As a nonlimiting example, a first partition/second partition may only include hardware resources of computing device 104 and/or a secondary computing device and/or active node. As another nonlimiting example, a first partition/second partition may include a combination of a portion of hardware resources of computing device 104 and a portion of hardware resources of at least a secondary computing device, consistent with details described above pertaining to hardware allocation. Additional details regarding partitions will be provided below in this disclosure.

With continued reference to FIG. 1, in one or more embodiments, virtual environment 128 may further include at least a hypervisor. For the purposes of this disclosure, a "hypervisor" is a software or firmware that allows multiple virtual computing devices to run on a single physical machine, sharing its resources including without limitation CPU, memory, and storage, among others. A hypervisor may create and manage these virtual environments 128, making it possible for each virtual computing device to run its own operating system and applications independently, as if it were a separate physical system. In one or more embodiments, a hypervisor may include software configured as a virtual machine monitor (VMM). In some cases, a hypervisor may be configured to allow a physical machine, such as a computing device, to run a plurality of operating systems simultaneously by virtualizing system hardware e.g., processors, memory, I/O devices, and/or the like. In some cases, a hypervisor may run directly on the hardware of a computing device without reliance of an operating system. Instantiating a hypervisor may include launching or initializing the hypervisor in a host operating system. In some cases, instantiation of a hypervisor may create a virtual environment 128 wherein a plurality of partitions 132 may be run and managed.

With continued reference to FIG. 1, in one or more embodiments, at least a processor 108 may be configured to deploy a static partitioning 152 that isolates first partition, as described herein, from at least a second partition, as described herein. For the purposes of this disclosure, a "static partitioning" is a predefined barrier in a virtual environment 128 that separates one set of physical resources from another. Such physical resources may include without limitation CPU, memory, storage, and network bandwidth, among others, consistent with details described above.

With continued reference to FIG. 1, in some cases, at least a hypervisor may be configured to deploy at least a virtual machine (VM) as a function of static partitioning. For the purposes of this disclosure, a "virtual machine (VM)" is a software-based emulation of a physical computing device that runs an operating system (OS) and one or more applications therein just like a physical machine would. A VM may run on top of a physical host system but be completely isolated from it, allowing multiple VMs to run on the same hardware independently. Each VM behaves as though it is a separate, physical computer, with its own virtualized CPU, memory, storage, and network resources. As a nonlimiting example, at least a hypervisor may create one or more VMs, wherein each VM may host a separate and isolated software operating environment (SOE). Additional details will be provided below in this disclosure.

With continued reference to FIG. 1, in one or more embodiments, hypervisor may include a "type 1 hypervisor" that runs independently of its host operating environment. As a nonlimiting example, a type 1 hypervisor may include a bare-metal hypervisor that runs directly on the hardware of a computing device and manages one or more guest operating systems. Exemplary type 1 hypervisors may include without limitation MICROSOFT HYPER-V, VMWARE ESXI, XEN, and/or the like. In some cases, VMs created by a type 1 hypervisor may communicate directly with the hardware of a computing device rather than a host operating system. In some cases, VMs created by a type 1 hypervisor may not be susceptible to issues caused by a host operating system and/or other VMs in virtual environment 128. As a nonlimiting example, one or more VMs may be isolated and unaware of the existence of other VMs. In one or more embodiments, a type 1 hypervisor may allow for an increased performance wherein VMs within a virtual environment 128 may communicate directly with hardware rather than through an intermediate host operating system. As a nonlimiting example, a type 1 hypervisor may allow one or more VMs to run simultaneously, wherein a failure of a first VM may not result in a failure of a second VM.

With continued reference to FIG. 1, in one or more embodiments, hypervisor may include a "type 2 hypervisor" that runs atop host operating system in a manner similar to a software application. In one or more embodiments, a type 2 hypervisor may include a hosted hypervisor having resource allocation occurred right above host operating system. In some cases, a type 2 hypervisor may rely on a host operating system of a computing device, whereas a type 1 hypervisor, as described above, may only rely on the hardware of a computing device. Exemplary type 2 hypervisors may include without limitation VMWARE WORKSTATION, ORACLE VIRTUAL BOX, and/or the like. In some cases, when instantiating a type 2 hypervisor, at least a processor 108 may launch the type 2 hypervisor that has been pre-installed, in a manner similar to launching any software application. Once a host operating system is up and running, at least a processor 108 may then start a type 2 hypervisor to create, manage and run VMs atop the host operating system. However, for a type 1 hypervisor, since it runs directly on "bare metal" (i.e., hardware without requiring an underlying operating system), instantiating a type 1 hypervisor may involve booting the system from a medium such as, without limitation, a USB drive, CD, or a network source containing the type 1 hypervisor. Once booted, the type 1 hypervisor may then take control of at least a portion of hardware resources and manage and/or launch one or more VMs.

Continuing to reference FIG. 1, processor 108 may be configured to detect plurality of active nodes 120 using network discovery protocols. As used herein, a "network discovery protocol" is a communication protocol that allows for finding and tracking nodes within a network. For example, network discovery protocol may be used to find servers, firewalls, applications, relationships between nodes, and the like. In an exemplary embodiment, network discovery protocol may include using a link layer discovery protocol. Processor 108 may be configured to use link layer discovery protocol to discover additional nodes and receive information about computation capabilities of those additional nodes.

Still referring to FIG. 1, processor 108 may be configured to detect plurality of active nodes 120 using broadcast messages. In an embodiment, processor 108 may be configured to transmit broadcast message, such as an address resolution protocol (ARP) request, across a network. Broadcast message may be used to discover active nodes 120 within a network and/or establish communication with any active nodes 120 discovered using the ARP request.

With continued reference to FIG. 1, active nodes 120 within a network may be found and/or identified through intermittent connectivity wherein nodes may come into contact within each other when they are within a communication range. In one or more embodiments, when nodes come into contact with each other, the nodes share information such that data is transferred from one node to another. In one or more embodiments, nodes may communicate with other nodes based on routing protocols. In one or more embodiments, active nodes 120 may be found using periodic beaconing or encounter logging such that data may be transferred from one node to another node.

With continued reference to FIG. 1, active nodes 120 may transmit information using different communication and/or network channels. In one or more embodiments, nodes may transmit information over wireless fidelity (Wi-Fi). In one or more embodiments, data may be transmitted over Wi-Fi networks in areas with widespread Wi-Fi coverage. In one or more embodiments, active nodes 120 may transmit information through Bluetooth wherein information may be transmitted to devices near one another. In one or more embodiments, nodes may transmit information along cellular networks such as 2G, 3G, 4G and/or 5G networks. In one or more embodiments, information may be transmitted between active nodes 120 using satellite communication wherein nodes may be transmitted between each other in remote areas and/or over long distances. In one or more embodiments, active nodes 120 may communicate using Ad Hoc networks wherein nodes may communicate with each other directly without a centralized infrastructure. In one or more embodiments, active nodes 120 may transmit information on tactical radio networks operating on differing frequency bands. In one or more embodiments, active nodes 120 may transmit information and/or data clusters using mesh networks, secure communication protocols, UAV relays and the like. In one or more embodiments, active nodes 120 may transmit information using any of the network channels as described above.

With further reference to FIG. 1, processor 108 is configured to receive a plurality of computing tasks 136 associated with the plurality of active nodes 120 for execution in the group computing environment 124. In an exemplary embodiment, processor 108 is configured to receive plurality of computing tasks 136 from a transmission. Transmission may include, and without limitation, transmission from a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. In one or more embodiments, processor 108 may be configured to receive plurality of computing tasks 136 from a network server.

Still referring to FIG. 1, processor 108 is configured to determine a computing demand 140 associated with each of the plurality of computing tasks 136 on the group computing environment 124. As used herein, "computing demand" is a numeric representation of an amount of computational resources needed from group computing environment for completion of a computing task. In an exemplary embodiment, computing demand 140 may be determined based on a number of different of different considerations. For example, computing demand 140 may be determined based on task complexity. As used herein, "task complexity" is a measure of difficulty and sophistication involved in execution of a computing task. In an exemplary embodiment, processor 108 may be configured to determine a computing demand for a computing task that is more difficult and sophisticated to execute may be higher than a computing demand for a computing task that is simple and less sophisticated to execute. Additionally, or alternatively, processor 108 may be configured to determine computing demand 140 based on performance specification for the computing task. As used herein, "performance specification" is information regarding an expectation of how well and/or quickly a computing task is to be performed. In an exemplary embodiment, processor 108 may be configured to determine a computing demand for a computing task with greater performance specification may be higher than a computing demand for a computing task that has a lower performance specification.

With further reference to FIG. 1, in an embodiment, processor 108 may utilize a demand machine learning model 144 to determine computing demand 140 for each of a plurality of computing tasks 136. Demand machine learning model 144 may include any machine learning model as described in this disclosure. Processor 108 may use a machine learning module, such as a demand machine learning module for the purposes of this disclosure, to implement one or more algorithms or generate one or more machine-learning models, such as a demand machine learning model 144 to generate computing demand 140 for each of plurality of computing tasks 136. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1, a machine learning module, such as demand machine learning module, may be used to create demand machine learning model 144 and/or any other machine learning model using training data. Demand machine learning model 144 may be trained by correlated inputs and outputs of training data. Training data may be data sets that have already been converted from raw data whether manually, by machine, or any other method. Demand training data may be stored in database 116. Demand training data may also be retrieved from database 116. In some cases, demand machine learning model 144 may be trained iteratively using previous inputs correlated to previous outputs. For example, processor 108 may be configured to store exemplary computing task inputs and their corresponding exemplary computing demand outputs from current iterations to train the machine learning model. In some cases, the machine learning model may be trained based on demand feedback. In an embodiment, demand feedback may be received as a function of user input. For example, a user may indicate that determined computing demands were unreliable and/or inaccurate, wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, demand training data may include a plurality of exemplary computing task inputs correlated to a plurality of exemplary computing demand outputs. In one or more embodiments, plurality of computing tasks may be determined based on a plurality of active nodes, as described herein. In an embodiment, computing demand may include a numeric representation of necessary computational resources for completion and/or execution of a computational task. In one or more embodiments, demand machine learning model 144 may be configured to output computing demand based on plurality of computing tasks. In one or more embodiments, demand machine learning model 144 may be trained using historical data such as computing demand for computing tasks determined in previous iterations. In one or more embodiments, following each iteration of execution of plurality of tasks 124, plurality of tasks 124 and their corresponding computational resources used execution may be used to iteratively train demand machine learning model 144 in order to create more accurate computing demands. In one or more embodiments, training of demand machine learning model 144 may allow for generation of more accurate computing demand and may increase the reliability of prioritization of plurality of tasks in group computing. Further, additionally, or alternatively, determining the computing demand 140 for each of the plurality of computing tasks may include determining the computing demand 140 for each of the plurality of computing tasks as a function of the trained criticality machine learning model.

With continued reference to FIG. 1, processor 108 may determine computing demand using a lookup table. A "lookup table," for the purposes of this disclosure, is an array of data that maps input values to output values. A lookup table may be used to replace a runtime computation with an array indexing operation. In another non limiting example, a computing demand look up table may be able to relate any computation task to a computing demand. A computing demand lookup table may relate a plurality of computing tasks each to a computing demand. Processor 104 may be configured to "lookup" one or more computing tasks and the like, in order to find a corresponding computing demand.

With further reference to FIG. 1, processor 108 is configured to generate priority data 148 for the plurality of computing tasks as a function of the computing demand 140 associated with each of the plurality of computing tasks 136. In an embodiment, generating priority data 148 for the plurality of computing tasks 136 may include ordering the plurality of computing tasks as a function of the computing demand 140 for each of the plurality of computing tasks 136. For example, processor 108 may be configured to generate an ordered list ranking plurality of computing tasks 136 in order from higher computing demands to lower computing demands. Such a list may indicate computing tasks with increased computing demands should be prioritized for execution in group computing environment 124 to ensure availability of computational resources for additional computing tasks at a future time. Additionally, or alternatively, processor 108 may be configured to generate an ordered list ranking plurality of computing tasks 136 in order from lower computing demands to higher computing demands. Such a list may indicate computing tasks with lower computing demands should be prioritized for execution in group computing environment 124 to complete a portion of computing tasks as quickly as possible.

Continuing to reference FIG. 1, at least a processor 108 may be further configured to determine a criticality factor for each of the plurality of computing tasks. As used herein, "criticality factor" is a numeric representation of a computing task's importance to operations compared to other computing tasks of the plurality of computing tasks. In an embodiment, criticality factor may be determined based on a user input. For example, processor 108 may be configured to receive a user input indicating computing tasks that may be more critical for an ongoing operation within network and processor 108 may be configured to generate criticality factor based on user input. Additionally, or alternatively, in one or more embodiments, processor 108 may utilize a criticality machine learning model. Criticality machine learning model may include any machine learning model as described in this disclosure. Processor 108 may use a machine learning module, such as a criticality machine learning module for the purposes of this disclosure, to implement one or more algorithms or generate one or more machine-learning models, such as a criticality machine learning model to generate criticality factor for each of plurality of computing tasks 136. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1, a machine learning module, such as criticality machine learning module, may be used to create criticality machine learning model and/or any other machine learning model using training data. Criticality machine learning model may be trained by correlated inputs and outputs of training data. Training data may be data sets that have already been converted from raw data whether manually, by machine, or any other method. Criticality training data may be stored in database 116. Criticality training data may also be retrieved from database 116. In some cases, criticality machine learning model 168 may be trained iteratively using previous inputs correlated to previous outputs. For example, processor 108 may be configured to store exemplary computing task inputs and their corresponding exemplary criticality factor outputs from current iterations to train the machine learning model. In some cases, the machine learning model may be trained based on priority feedback. In an embodiment, priority feedback may be received as a function of user input. For example, a user may indicate that determined criticality factors were unreliable and/or inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, criticality training data may include a plurality of exemplary computing task inputs correlated to a plurality of exemplary criticality factor outputs. In one or more embodiments, plurality of computing tasks may be determined based on a plurality of active nodes, as described herein. In an embodiment, criticality factor may include a numeric representation of a computing task's importance to operations compared to other computing tasks of the plurality of computing tasks. In one or more embodiments, criticality machine learning model may be configured to output criticality based on plurality of computing tasks. In one or more embodiments, criticality machine learning model may be trained using historical data such as criticality factors for computing tasks determined in previous iterations. In one or more embodiments, following each iteration of execution of plurality of tasks 124, plurality of tasks 124 and their corresponding execution time and/or outcomes during execution may be used to iteratively train criticality machine learning model in order to create more accurate criticality factors. In one or more embodiments, training of criticality machine learning model may allow for generation of more accurate criticality factors and may increase the reliability of prioritization of plurality of tasks in group computing. Further, additionally, or alternatively, determining the criticality factor for each of the plurality of computing tasks may include determining the criticality factor for each of the plurality of computing tasks as a function of the trained criticality machine learning model.

With continued reference to FIG. 1, processor 108 may determine criticality factor using a lookup table. In another non limiting example, a criticality factor look up table may be able to relate any computation task to a criticality factor. A criticality factor lookup table may relate a plurality of computing tasks each to a criticality factor. Processor 104 may be configured to "lookup" one or more computing tasks and the like, in order to find a corresponding criticality factor.

Still referring to FIG. 1, generating priority for the plurality of computing tasks may include prioritizing the plurality of computing tasks 136 as a function of the criticality factor for each of the plurality of computing tasks. In an embodiment, processor 108 may be configured to generate an ordered list ranking plurality of computing tasks 136 in order from higher criticality factors to lower criticality factors. Such a list may indicate computing tasks with higher criticality factors may have more importance relative to other group computing tasks and should be prioritized for execution in group computing environment 124.

Continuing to reference FIG. 1, the at least a processor may be further configured to determine a security factor for each of the plurality of computing tasks. As used herein, "safety factor" is a numeric representation of a computing task's importance to security of networks, nodes, computing environments, and the like compared to other computing tasks of the plurality of computing tasks. In an embodiment, criticality factor may be determined based on a user input. For example, processor 108 may be configured to receive a user input indicating computing tasks that may be more critical for an ongoing operation within network and processor 108 may be configured to generate criticality factor based on user input. In one or more embodiments, processor 108 may utilize a safety factor machine learning model to determine security factor for each of the plurality of computing tasks. Safety factor machine learning model may include any machine learning model as described in this disclosure. Processor 108 may use a machine learning module, such as a safety factor machine learning module for the purposes of this disclosure, to implement one or more algorithms or generate one or more machine-learning models, such as a safety factor machine learning model to generate safety factor for each of plurality of computing tasks 136. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1, a machine learning module, such as safety factor machine learning module, may be used to safety factor criticality machine learning model and/or any other machine learning model using training data. Safety factor machine learning model may be trained by correlated inputs and outputs of training data. Training data may be data sets that have already been converted from raw data whether manually, by machine, or any other method. Safety factor training data may be stored in database 116. Safety factor training data may also be retrieved from database 116. In some cases, safety factor machine learning model may be trained iteratively using previous inputs correlated to previous outputs. For example, processor 108 may be configured to store exemplary computing task inputs and their corresponding exemplary safety factor outputs from current iterations to train the machine learning model. In some cases, the machine learning model may be trained based on priority feedback. In an embodiment, priority feedback may be received as a function of user input. For example, a user may indicate that determined safety factors were unreliable and/or inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, criticality training data may include a plurality of exemplary computing task inputs correlated to a plurality of exemplary safety factor outputs. In one or more embodiments, plurality of computing tasks may be determined based on a plurality of active nodes, as described herein. In an embodiment, safety factor may include a numeric representation of a computing task's importance to security compared to other computing tasks of the plurality of computing tasks. In one or more embodiments, safety factor machine learning model may be configured to output safety factor based on plurality of computing tasks. In one or more embodiments, safety factor machine learning model may be trained using historical data such as safety factor for computing tasks determined in previous iterations. In one or more embodiments, following each iteration of execution of plurality of tasks 124, plurality of tasks 124 and their corresponding execution time and/or outcomes during execution, for example a data loss, data breach, and the like, may be used to iteratively train criticality machine learning model in order to create more accurate criticality factors. In one or more embodiments, training of safety factor machine learning model may allow for generation of more accurate safety factors and may increase the reliability of prioritization of plurality of tasks in group computing. Further, additionally, or alternatively, determining the safety factor for each of the plurality of computing tasks may include determining the safety factor for each of the plurality of computing tasks as a function of the trained criticality machine learning model.

With continued reference to FIG. 1, processor 108 may determine safety factor using a lookup table. In another non limiting example, a safety factor look up table may be able to relate any computing task to a safety factor. A safety factor lookup table may relate a plurality of computing tasks to a criticality factor. Processor 104 may be configured to "lookup" one or more computing tasks and the like, in order to find a corresponding safety factor.

Still referring to FIG. 1, generating priority data 148 for the plurality of computing tasks may include prioritizing the plurality of computing tasks 136 as a function of the safety factor for each of the plurality of computing tasks 136. In an embodiment, processor 108 may be configured to generate an ordered list ranking plurality of computing tasks 136 in order from higher safety factors to lower safety factors. Such a list may indicate computing tasks with higher safety factors may have more importance for security reasons relative to other group computing tasks and should be prioritized for execution in group computing environment 124.

With further reference to FIG. 1, processor 108 may be further configured to communicate the priority data 148 for the plurality of computing tasks to the plurality of active nodes 120. In one or more embodiments, priority data 148 may be divided into a plurality of data clusters wherein each data cluster includes a portion of priority data 148. A "data cluster" for the purposes of this disclosure is a unit of data that is encapsulated for transmission. For example, and without limitation, data cluster may contain a portion of priority data 148 wherein the portion of update data may be transmitted to operating environment 128. In an embodiment, multiple portions of priority data 148 may be transmitted to active nodes 120 wherein each active node 120 may receive the portions and reconstruct priority data 148 from the data clusters. In one or more embodiments, data clusters may be transmitted independently, such that priority data 148 may be transmitted in portions. In one or more embodiments, data clusters may be independently encrypted to ensure further security. In one or more embodiments, processor 108 may be configured to create a plurality of data clusters and encrypt each data cluster. In one or more embodiments, processor 108 may be configured to assign a unique identifier to each data cluster, wherein the unique identifier may be used to determine the placement of each data cluster when they are all ultimately received and combined to create priority data 148. In one or more embodiments, unique identifiers associated with data clusters may be encrypted to ensure that an unwanted recipient may not intercept data clusters and combine them to create priority data 148. In one or more embodiments, both the data clusters and the unique identifiers may be encrypted with similar or differing encryption processes to ensure a two-level system of protection.

With continued reference to FIG. 1, processor 108 may divide priority data 148 into a plurality of data clusters using fragmentation. In one or more embodiments, fragmentation may include a process in which data is divided into smaller chucks or packets, wherein each chunk or packet is encapsulated into a separate data cluster. In one or more embodiments, fragmentation may occur that the network or transport layer by protocols designed for delay tolerant networking environments. In one or more embodiments, protocols used for fragmentation may include bundle protocols (BP) specified by the internet engineering task force. In one or more embodiments, the size of fragments or data clusters may be determined based on real-time network conditions, such as bandwidth, node buffer, latency and the like. In one or more embodiments, processor may fragment update data into multiple fragments prior to transmission wherein each fragment may be transported as a data cluster. In one or more embodiments, fragmentation may occur prior to transmission and/or at the bundle layer itself. In one or more embodiments, data clusters may first be created for transmission wherein data clusters may further be fragmented into sub-clusters during transmission based on network availability, latency and the like. In one or more embodiments, a fragmentation process may include dynamic fragmentation. In one or more embodiments, dynamic fragmentation may include a process in which the size and number of data clusters are determined based on real-time network conditions such as available bandwidth, node buffer and the like. In one or more embodiments, processor, a central server and/or the network responsible for transmission may fragment priority data 148 based on network availability. In one or more embodiments, each data cluster may contain a portion of priority data 148 wherein, when aggregated the plurality of data clusters may be used to reconstruct priority data 148 at the destination such as active nodes 120.

Continuing to reference FIG. 1, priority data 148 may be transmitted across active nodes 120. In one or more embodiments, priority data 148 may be transmitted using store-and-forward routing wherein nodes may temporarily store data clusters until active node 120 is found. In one or more embodiments, in store-and-forward routing, nodes store information until a suitable node is found. In one or more embodiments, store-and-forward networking may be useful in instances in which a continuous communication cannot be made across all active nodes 120. In one or more embodiments, in instances in which group computing environments are located in remote areas, such as in a desert or in space, store-and-forward networking allows for nodes to hold information until a communication can be established in the next node.

With further reference to FIG. 1, in one or more embodiments, priority data 148 may be transmitted using epidemic routing. In one or more embodiments, epidemic routing includes a process in which nodes replicate data clusters and transmit the replicated data clusters to newly discovered nodes that have not already received the data clusters. In one or more embodiments, nodes may keep track of received messages in order to prevent redundancy. In one or more embodiments, epidemic routing may allow for data clusters to be transmitted across a plurality of nodes to ensure that at least one data cluster reaches its desired destination. In one or more embodiments, priority data 148 may be transmitted using epidemic routing wherein plurality of data clusters are replicated and transmitted to any available node until plurality of data clusters are received by active nodes 120. In one or more embodiments, active nodes 120 may be configured to keep track of receipt of data clusters in order to prevent redundant transmission of data clusters. In one or more embodiments, active nodes 120 may be configured to receive only one version of each data cluster in order to prevent redundancy. In one or more embodiments, duplicate data may be created during transmission wherein data clusters may be replicated and transmitted to multiple nodes to ensure proper receipt of data clusters. In one or more embodiments, epidemic routing may utilize heavy resources or bandwidth yet allow for proper transmission of update data over a non-reliable network. In one or more embodiments, epidemic routing may allow for data clusters to be continuously replicated and transmitted throughout a network until the data clusters reach each of plurality of active nodes. In one or more embodiments, a recipient, such as operating environment 128 may be configured to only receive one copy of each data cluster. In one or more embodiments, epidemic routing may allow for data clusters to be transmitted across a particular active node 120 only once in order to prevent redundancy of data clusters. In one or more embodiments, during epidemic routing, active nodes 160 may be configured to cease transmission if the receiving node has already received the particular data cluster.

With continued reference to FIG. 1, processor 108 may transmit priority data 148 using parallel transmission. For the purposes of this disclosure "parallel transmission" refers to a process in which similar data is transmitted simultaneously over differing channels to the same destination. For example, and without limitation, priority data 148 may be transmitted over a cellular network to operating environment whereas duplicate data may be transmitted over a satellite network. In one or more embodiments, priority data 148 and duplicate data may be transmitted simultaneously over multiple differing network channels to active nodes 120. In one or more embodiments, active nodes 120 and/or a network may compare update data to duplicate data to determine if any data clusters were lost or corrupted during transmission. In one or more embodiments, active nodes and/or a network device such as a router, switch, gateway and the like may be configured to receive update data and duplicate data and compare both data files to ensure that data clusters were not lost during transmission. In one or more embodiments, multiple copies of update data may be transmitted over multiple differing network channels wherein data may be compared to ensure proper transmission. In instances in which two replicated data files are not similar, then active node may not utilize update data as the data file may be corrupt or unfit for use. In one or more embodiments, error correction and correction mechanisms may be used to identify and resolve transmission errors or modifications. In one or more embodiments, multiple channels employ different modulation schemes, frequencies, or transmission paths to ensure that if one channels experience interference or degradation, others can still transmit.

Figure 2:
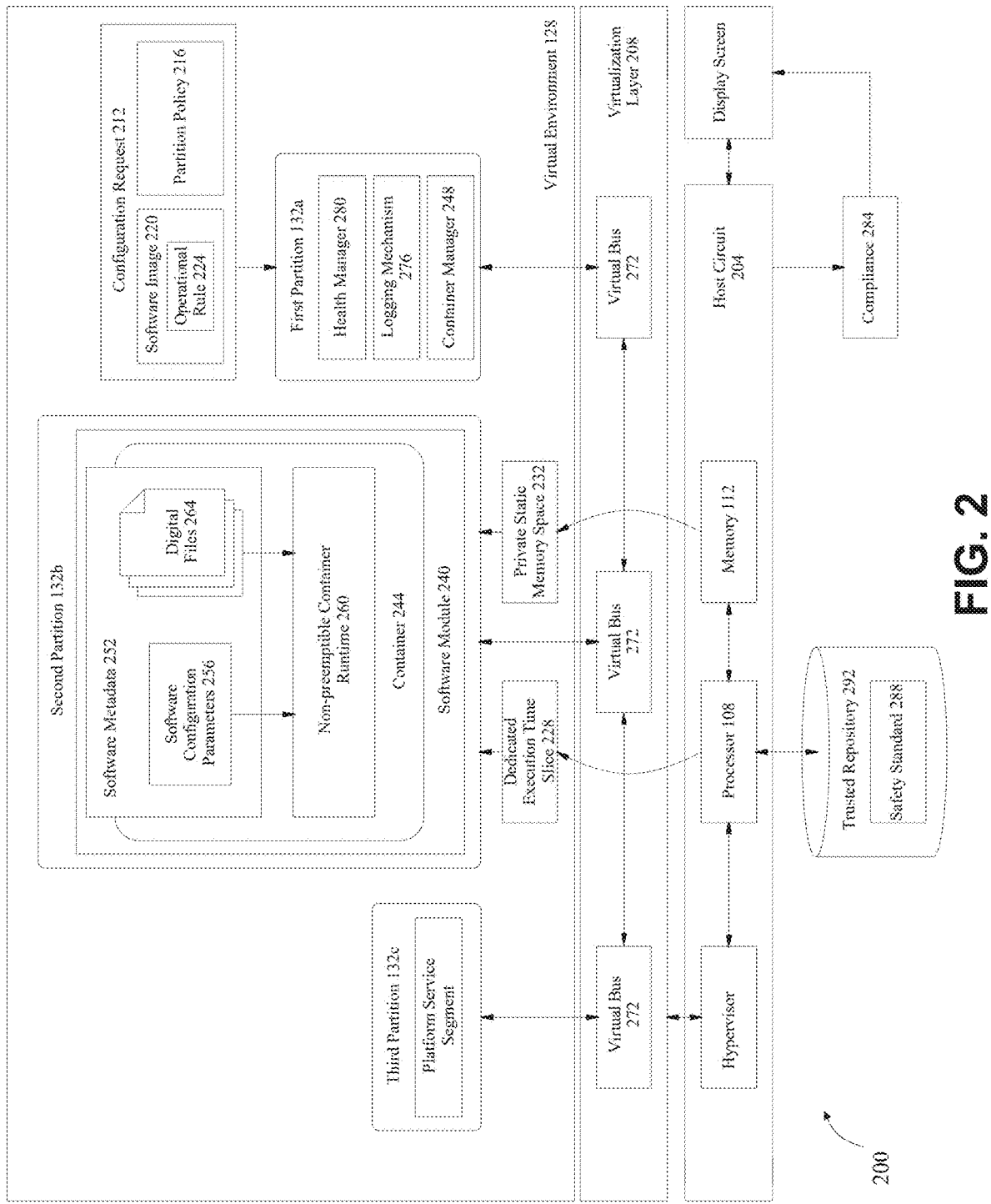
FIG. 2 is an exemplary embodiment of a block diagram illustrating a virtual environment pertaining to the apparatus described in FIG. 1.

Referring now to FIG. 2, an exemplary embodiment 200 of a virtual environment 128 and elements related thereto is illustrated. Virtual environment 128 is created using a host circuit 204. For the purposes of this disclosure, a "host circuit" is an integrated circuit or a collection of interconnected circuits designed to manage, control, and/or interface with one or more functionalities in a system. As a nonlimiting example, host circuit 204 may be configured as a primary platform or base that provides essential infrastructure, resources, and interfaces to facilitate the operation of other connected or integrated components. Host circuit 204 may include any computing device as described in this disclosure.

With continued reference to FIG. 2, host circuit 204 operates a first partition 132*a* within virtual environment 128, consistent with details described above in this disclosure. As a nonlimiting example, plurality of partitions 132*a-n*, e.g., first partition 132*a*, second partition 132*b*, third partition 132*c*, etc., may be allocated inside virtual environment 128, wherein each partition 132*a-n* of plurality of partitions 132*a-n* includes a virtual machine (VM), such as any virtual machine described herein. Operating first partition 132*a* may include instantiating a hypervisor 148, consistent with details described above.

With continued reference to FIG. 2, in one or more embodiments, at least a processor 108 may generate a virtualization layer 208 supervised by hypervisor 148, wherein first partition 132*a* within virtual environment 128 is operated by the virtualization layer 208. For the purposes of this disclosure, a "virtualization layer" is a software layer or interface that sits between a hardware layer and virtual environment 128 having one or more VMs. The hardware layer may include without limitation a physical CPU, memory, I/O devices, and/or the like. In some cases, virtualization layer 208 may be configured to virtualize the underlaying hardware resources and present the virtualized hardware resources to plurality of VMs as if they are dedicated to each VM. As a nonlimiting example, a plurality of partitions, as described herein, may share the same physical hardware resources through virtualization layer 208, without being aware of each other. In some cases, virtualization layer 208 may be instantiated when hypervisor 148 is booted or launched. As a nonlimiting example, in case of a type 1 hypervisor, virtualization layer 208 may be generated when machine starts up, since hypervisor 148 directly interfaces with the hardware. In another nonlimiting example, in case of a type 2 hypervisor, virtualization layer may be established once a hypervisor software is initiated on top of a host OS. In some cases, hypervisor 148 may be configured to monitor and/or manage one or more hardware abstraction and allocate these virtualized resources to designated VMs. As a nonlimiting example, virtualized resources may include CPU time, memory space, I/O operations and/or the like. In some cases, virtualized resources may be allocated based on a partition policy as described in detail below. In some cases, hypervisor 148 may manage the scheduling of VM tasks on actual cores. In some cases, hypervisor 148 may handle interruptions, exceptions, and any events that may occur, deciding which VM or service needs attention. In some cases, hypervisor 148 may be configured to isolate one or more VMs from the rest of VMs to maintain system security and stability. In other cases, hypervisor 148 may be configured to manage lifecycle operations of one or more VMs such as without limitation creation, modification, deletion, migration, and/or the like.

With continued reference to FIG. 2, as a nonlimiting example, when first partition 132*a* is created, a pre-defined set of virtual hardware resources may be provided by virtualization layer 208. The pre-defined set of virtual hardware resources may include without limitation a portion of virtualized memory, virtual disks, virtual network interfaces, among others. As first partition 132*a* attempts to execute one or more operations or access its "hardware", the first partition 132*a* may actually interface with virtualization layer 208. As a nonlimiting example, when a VM tries to use at least a processor 108, it may be scheduled by hypervisor 148 onto a physical processor within host circuit 204, through virtualization layer 208. In some cases, first partition 132*a* may perceive these resources as if they are dedicated hardware components, oblivious to the abstraction layer beneath.

In some cases, virtualization layer 208 may handle I/O operations, translating virtual disk or network accesses to actual operations on a physical hardware. Any interruption, exception, or system call made by first partition 132a may be intercepted by virtualization layer 208, which may then communicate with hypervisor 148 to handle or service that request.

With continued reference to FIG. 2, in some cases, hypervisor 148 may include single root input output virtualization (SR-IOV). For the purposes of this disclosure, "single root input output virtualization" is a software capability in which single peripheral component interconnect express (PCIe) devices may be virtualized into multiple virtual devices. As a nonlimiting example, a network adapter may be virtualized wherein multiple virtual adapters may exist. In one or more embodiments, SR-IOV may include a virtualization of physical components such as without limitation a GPU, network adapter, storage controllers, Field Programmable Gate Array (FPGA) devices, audio processing cards, solid state drives, and/or the like. In one or more embodiments, SR-IOV may allow for partitions to access a single physical device. In one or more embodiments, first partition 132a may have direct access to a physical device without an operating system allocating resources. In one or more embodiments, SR-IOV may allow for resources to be shared, such as without limitation network adapters, while still maintaining independence. In one or more embodiments, SR-IOV may allow for multiple VMs operating on hypervisor 148, e.g., a type 1 hypervisor, to have access to physical devices without an intermediary such as a shot operating system. In one or more embodiments, host circuit 204 may contain physical hardware that is capable of virtualization. In one or more embodiments, hypervisor 148 may contain the proper systems and/or software to enable SR-IOV, wherein a VM may receive a virtual component. In one or more embodiments, SR-IOV may allow for one or more separate virtual environments with direct access to one or more physical hardware components of host circuit 204.

With continued reference to FIG. 2, in some embodiments, in one or more embodiments, plurality of partitions 132a-n may include at least a dedicated partition, wherein one or more I/O operations may be consolidated into the at least a dedicated partition. In some cases, such partition may include a specialized VM that is configured to manage and handle I/O operations for other VMs, acting as an intermediary between plurality of partitions 132a-n and/or quest VMs and physical hardware resources through an I/O physical bus, e.g., a virtualized PCI bus that connects devices to the main system. As a nonlimiting example, at least a dedicated partition 132a-n may include an I/O VM containing a plurality of FACE I/O service segments (IOSS), wherein each IOSS may provide a standardized interface between OSS and platform-specific hardware. An I/O VM may be configured to manage all I/O operations in adherence to FACE technical standards, as described above. As a nonlimiting example, through a plurality of IOSS, an I/O VM may include a VM that interface directly with a platform's avionic hardware connected to host circuit 204, in a way that is standardized across different air vehicles and systems. In some cases, standardized device drives and/or adapters may be provided by IOSS for various avionic devices. As a nonlimiting example, when a quest VM or a software application integrated into the system as described below wants to access a hardware resources, it may be configured to indirectly communicate with an I/O VM, and a plurality of IOSS having standardized drivers for the hardware may process the request as per pre-defined system specification (e.g., FACE specification). In such cases, other partitions or VMs may be less susceptible to I/O-related faults or security breaches. Security protocols may be standardized and attach surface may be reduced by centralizing drivers and I/O operations, since other VMs do not directly access I/O hardware, thereby reducing potential vulnerabilities. In some other cases, updates or changes to one or more I/O device drivers or I/O related services may be done in a I/O VM without affecting or rebooting the rest of VMs.

With continued reference to FIG. 2, in one or more embodiments, at least a processor 108 may be configured to receive a configuration request 212 from first partition 132a, wherein the configuration request 212 includes at least a partition policy 216 and a software image 220. In some cases, configuration request 212 may be sent by a software entity, as described below, or a component such as without limitation one or more partitions 132a-n within virtual environment 128, asking another entity, such as without limitation a host OS or hypervisor 148, to establish, modify, and/or provide a desired SOE. As a nonlimiting example, first partition 132a may include a management VM configured to monitor, manage, and/or administer overall operations and resources within virtual environment 128. As another nonlimiting example, first partition 132a may include, or at least interfacing with, one or more health monitors, system health management PSSS, aircraft system monitoring PCS, operational mode management PCS, and/or the like.

With continued reference to FIG. 2, for the purpose of this disclosure, a "partition policy" is a rule, constraint, or configuration pertaining to how a partition 132a-n or a virtual machine/container within virtual environment 128 accesses resources. In some cases, at least a partition policy 216 may be used to set forth static partitioning 152, as described above. In some cases, at least a partition policy 216 may specify how much CPU, memory, storage, network bandwidth and/or the like a partition 132a-n in question may utilize. In some cases, at least a partition policy 216 may also determine the scheduling policy for a partition 132a-n, for example and without limitation, the priority/operating time of the partition 132a-n and/or whether it's preemptible. In some embodiments, at least a partition policy 216 may define a level of separation between plurality of partitions 132a-n to ensure that the operation of one partition 132a-n doesn't adversely impact the operation of another partition 132a-n. In such embodiments, this configuration may prevent failures from propagating. In some cases, partition policy 216 may also outline what resources e.g., I/O devices, data files, network interfaces, and/or the like, a partition 132a-n may be able to access. In some cases, partition policy 216 may include a level of access (e.g., read, write, execute, and the like). As a nonlimiting example, in an aviation system, at least a partition policy 216 may be configured to ensure that a partition 132a-n handling a flight control logic gets the highest priority and is isolated from partitions 132a-n handling non-critical tasks, e.g., in-flight entertainment. As another nonlimiting example, partition policies 216 may balance computing resources allocation for achieving a desired system performance e.g., a desired energy efficiency, ensuring that each VM gets only the resources it needs.

With continued reference to FIG. 2, for the purposes of this disclosure, a "software image", also known as a "container image", is a snapshot or a packaged representation of an entire software state, including executable code, configurations, dependencies/libraries, and other required data. In some cases, software image 220 may include source code, libraries, and other software components that the software relies upon. In some cases, software image 220 may include one or more configuration files which define a plurality of settings, parameters, and other configurations for the software. In some cases, configuration files may include certain OS configurations, environmental variables, and/or other system-level settings. As a nonlimiting example, software image 220 may include a portable executable image combined with a manifest file that is used by a container manager, as described below, to deploy the software image 220 on an operating environment with appropriate data services and restrictions. In some cases, first partition 132a may interface with a software image repository containing a plurality of software images 220. In some cases, software image 220 may be used to package a software application with its entire collection of dependencies, ensuring that the software application may run consistently across different SOEs. Exemplary software applications may include without limitation flight management system (FMS) software, air traffic control (ATC) software, avionics software, electronic flight bag (EFB) software, ground support equipment software, weather forecasting and reporting software, cockpit display rendering software, and/or the like. In some cases, software image 220 may include a VM image that encapsulates a whole OS along with one or more pre-installed software applications. Such software image 220 may be easily replicated across a plurality of host circuits 204, e.g., servers or a cloud environment. In some other cases, software image 220 may be used as a backup snapshot to restore/roll back system or a software application to a known working state.

With continued reference to FIG. 2, in one or more embodiments, software images 220 may include a pre-defined operational rule 224. For the purposes of this disclosure, a "pre-defined operational rule" is a set of instructions or conditions that dictate how a software, when executed, should behave, respond, or operate under specific scenarios or environment. As a nonlimiting example, pre-defined operational rule 224 may encapsulate business logic or functional requirements of a software. In some cases, pre-defined operational rule 224 may specify a plurality of core functionalities and processes that a software is intended to perform. In some cases, per-defined operational rule 224 may include one or more error handling procedures, i.e., how software should respond to unexpected inputs or errors. In some cases, pre-defined operational rule 224 may include one or more security protocols, such as without limitation instructions related to authentication, authorization, data protection, and/or the like. Additionally, or alternatively, in some cases, pre-defined operational rule 224 may include one or more conditions and/or thresholds for software performance, e.g., response times, execution times, and/or the like. In one or more embodiments, a pre-defined operational rule 224 may be configured as a metric to ensure that a software application behaves in a pre-defined way. In one or more embodiments, a pre-defined operational rule 224 may dictate fail-safe behaviors or fallback procedures. As a nonlimiting example, a pre-defined operational rule 224 may dictate how a software application should respond if one or more sensors communicatively connected to host circuit 204 detects a certain anomaly in flight data during cruising, e.g., automatically engaging an emergency procedure. As another nonlimiting example, a pre-defined operational rule 224 may specify the process and validations for pilot inputs. In some cases, a missing pre-defined operational rule 224 may result in a failure to execute at least a part of the software application. In some cases, a pre-defined operational rule 224 may entirely depend on system health and safety; for example, and without limitation, a pre-defined operational rule 224 may be qualified under DO-178C or to ensure the availability, robustness, and integrity of an SOE.

With continued reference to FIG. 2, additionally, or alternatively, in one or more embodiments, configuration request 212 may be encrypted, by a virtual machine, a hypervisor 148, and/or a software/software module (as described below) in first partition 132a, prior to its transmission. In one or more embodiments, elements within first partition 132a may implement one or more aspects of a cryptographic system. For the purposes of this disclosure, a "cryptographic system" a system that converts data from a first form, known as "plaintext", which is intelligible when viewed in its intended format, into a second form, known as "ciphertext", which is not intelligible when viewed in the same way. The data to be converted by a cryptographic system may include without limitation configuration request 212, as described above. In some cases, configuration request 212 may be unintelligible in any format unless first converted back to plaintext. Such process of converting plaintext into ciphertext is known as "encryption". In some cases, encrypting configuration request 212 may include the use of a datum, such as an "encryption key", to alter plaintext configuration request 212. In some cases, at least a processor 108 (and first partition 132a) may convert ciphertext back into plaintext, which is a process known as "decryption". At least a processor 108 may be configured to decrypt configuration request 212 upon receipt. Decrypting configuration request 212 may include the use of another datum, such as a "decryption key", to return the ciphertext to its original plaintext form. In one or more embodiments, cryptographic system implemented by first partition 132a may include a "symmetric cryptographic system", wherein the decryption key may be essentially the same as the encryption key. As a nonlimiting example, possession of either key may make it possible to deduce the other key quickly without further secret knowledge. In some cases, encryption and decryption keys in symmetric cryptographic systems may be kept secret and shared only with trusted entities such as, without limitation, trusted partitions and/or at least a processor 108. As a nonlimiting example, first partition 132a may include an Advanced Encryption Standard ("AES"), which arranges configuration request 212 containing partition policy 216 and software image 220 into matrices and then modifies the matrices through repeated permutations and arithmetic operations with an encryption key.

With continued reference to FIG. 2, in some cases, first partition 132a may include an asymmetric cryptographic system, wherein either encryption or decryption key cannot be readily deduced without additional secret knowledge, even given the possession of a corresponding decryption or encryption key, respectively. As a nonlimiting example, first partition 132a may implement a "public key cryptographic system", in which possession of an encryption key does not make it practically feasible to deduce its corresponding decryption key, so that the encryption key may safely be made available to the public e.g., all partitions 132a-n within virtual environment 128. In some cases, public key cryptographic system may include Rivest-Shamir-Adleman (RSA), in which an encryption key involves the use of numbers that are products of very large prime numbers, but a decryption key involves the use of those very large prime numbers, such that deducing the decryption key from the encryption key requires a practically infeasible task of computing the prime factors of a number which is the product of two very large prime numbers. In some cases, first partition 132a may employ an elliptic curve cryptography, wherein the elliptic curve cryptography may rely on the fact that given two points, P and Q, on an elliptic curve over a finite field, and a definition for addition where A+B=−R, the point where a line connecting point A and point B intersects the elliptic curve. "0", the identity, is a point at infinity in a projective plane containing the elliptic curve. Finding a number k such that adding P to itself k times results in Q is computationally impractical, given a correctly selected elliptic curve, finite field, and P and Q.

With continued reference to FIG. 2, in some cases, configuration request 212 may be configured to initiate an encrypted handshake between two partitions 132a-n or between a partition 132a-n and an external system, wherein such handshake may involve an exchange of one or more encrypted messages to verify the identity of parties involved. As a nonlimiting example, first partition 132a may send configuration request 212 to at least a processor 108 to initiate a secure connection with a second partition 132a-n, as described in detail below, using a transport layer security (TLS) protocol, wherein both partitions 132a-n prove their identities to each other using encrypted keys. In some cases, configuration request 212 may specify that data stored or transmitted by one or more partitions 132a-n should be encrypted using AES, as described above. As a nonlimiting example, configuration request 212 may dictate that any data saved to disk by one or more partitions 132a-n must be encrypted with an AES-256 key. Only parties with the decryption key may transform ciphertext back into plaintext upon reading. In some cases, when two different keys are involved, one or more partitions 132a-n may use private keys to decrypt messages encrypted with corresponding public keys.

With continued reference to FIG. 2, in one or more embodiments, at least a processor 108 may be configured to verify the integrity of data or to ensure that configuration request 212 hasn't been tampered with using cryptographic hashes. For the purposes of this disclosure, a "cryptographic hash" or "hash", as used herein, is a mathematical representation of data, wherein the mathematical representation is produced by a lossy "one-way" algorithm known as a "hashing algorithm". Data to be represented by a hash may include without limitation configuration request 212 and data therewithin. In some cases, a hashing algorithm may be a repeatable process; that is, identical data may produce identical hashes each time they are subjected to a particular hashing algorithm. Since hashing algorithm is a one-way function, it may be impossible to reconstruct a lot of data from a hash produced from a lot of data using the hashing algorithm. In some cases, hashing algorithm may include one or more processes that reconstruct the full data from the corresponding hash using a partial set of data from the full data, which may be possible only by repeatedly guessing at the remaining data and repeating the hashing algorithm. It is thus computationally difficult, if not infeasible, for a single computer to produce the data, as the statistical likelihood of correctly guessing the missing data may be extremely low. As a nonlimiting example, when a configuration request 212 is sent, a SHA-256 hash of the request may be generated and sent alongside. At least a processor 108 or receiving partition 132a-n may hash the received configuration request 212 using the same algorithm and check if the hashes match to verify the data integrity.

With continued reference to FIG. 2, in one or more embodiments, at least a processor 108 may be configured to create a second partition 132b within virtual environment 128 as a function of configuration request 212. At least a processor 108 is configured to allocate a dedicated execution time slice 228 and a private static memory space 232 for second partition 132b using hypervisor 148, based on at least one partition policy 216, as described above. As a nonlimiting example, partition policy 216 may follow a particular partitioning design in which the partitioning is provided above a minimal kernel, as described in detail below with reference to FIG. 3, with specific resource guarantees. For the purposes of this disclosure, a "dedicated execution time slice" is an allocation of processor time. In one or more embodiments, hypervisor 148 described herein may be configured to create plurality of partitions 132a-n in a real-time operating system (RTOS) and virtual environment 128. As a nonlimiting example, host OS may include a RTOS. For the purposes of this disclosure, a "real-time operating system (RTOS)" is an operating system that is designed to serve real-time software applications that process data without buffer delays. In some cases, a RTOS may include a tolerance for processing delays. As a nonlimiting example, a dedicated execution time slice 228 may include a guaranteed access to CPU time within a defined schedule for a designated partition 132a-n, e.g., second partition 132b. Virtualization layer 208 may allow multiple OS to share single hardware host, i.e., host circuit 204, wherein a hypervisor 148 within the virtualization layer 208 may be responsible for managing CPU resources among a plurality of partitions 132a-n. As a nonlimiting example, one or more scheduling algorithms, e.g., round-robin, rate-monotonic, earliest deadline first, and/or the like, may be used to allocate CPU time to second partition 132b. In some cases, hypervisor 148 may enforce dedicated execution time slice 228 so that each partition 132a-n receives a desired processor time it requires to execute at least one operational rule 224, as described above, within its allotted window. In some cases, second partition 132b may be temporally isolated from other partitions 180a-c, thereby preventing the second partition 132b from hogging at least a processor 108 through virtualization layer 208 and causing performance degradation in other partitions 132a-n within the virtual environment 128. In some cases, one or more machine-learning models, as described below, may be used to intelligently determine a desired execution time slice 228 based on received software image 220 and/or at least one operational rule 224.

With continued reference to FIG. 2, for the purposes of this disclosure, a "private static memory space" is a fixed amount of memory allocated to a specific partition 132a-n that is not shared with or accessible by one or more other partitions 132a-n. In some cases, hypervisor 148 may be configured to spatially isolate second partition 132b from other partitions 132a-n within virtual environment 128 through such memory allocation. This step may be done, at least in part, for one or more performance and/or security purposes. As a nonlimiting example, upon creating a second partition 132b, hypervisor 148 may configure system's memory management unit (MMU), as described above, to allocate at least a block of physical memory to the second partition 132b according to partition policy 216. In some cases, private static memory space may be made exclusive to second partition 132b, meaning that no other partitions 132a-n may read from or write to such space. In some cases, the size of memory block may not change dynamically; it may be defined at the time when a configuration request 212 is received by at least a processor 108 from first partition 132a. As a nonlimiting example, the size of private static memory space may remain constant throughout a second partition 132b's lifecycle. Additionally, and/or alternatively, hypervisor 148 may read partition policy 216 upon system initialization or when a request to create a new partition 132a-n is received. Hypervisor 148 may then configure hardware resources through virtualization layer according to partition policy 216. As a nonlimiting example, partition policy 216 may include a default partition policy 216 specifying that a partition 132a-n should have at least 256 MB of RAM and 10 ms of CPU time every 100 ms to perform its intended function or functions. In one or more embodiments, memory 112 may be partitioned into a root partition 132a-n (also known as a parent partition) and one or more child partitions 132a-n. In some cases, only root partition 132a-n may include a host OS.

With continued reference to FIG. 2, in one or more embodiments, at least a processor 108 may be configured to integrate a software module 240 into virtual environment 128, using pre-defined operational rule 224. This step may be done by instantiating, within second partition 132b, software image 220 into at least one container 244, wherein the at least one container 244 includes a non-preemptible container runtime 260. For the purposes of this disclosure, a "software module" is a distinct unit of software that includes one or more computer programs designed to perform at least one particular function or a set of functions. In some cases, such functions may be provided by at least one operational rule 224. In some cases, a software module 240 may interact with other components via one or more interfaces (e.g., APIs). In one or more embodiments, a software module 240 may be designed to be reusable and to provide certain functionality that may be integrated into one or more different operating systems or larger software applications. As a nonlimiting example, at least one operational rule 224 may include a series of rules or polices that dictate how a software module 240 interacts with the system and/or the users, which may include, without limitation, how to utilize computational resources, how it is executed, and/or the like. As another nonlimiting example, in an SCOE, such as an avionics system as described herein, at least one operational rule 224 may ensure that a software module 240 does not interfere with any operation of other system components, e.g., partitions 132a-n, within virtual environment 128. A software module 240 may use dedicated system resources, e.g., dedicated execution time slice 228, private static memory space 232, or one or more other functionalities or services provided by other partitions 132a-n within virtual environments 140, such as a plurality of third partitions 132c, in a way that does not degrade system performance, and that software module 240 may run within certain safety and security measurements, as described in detail below.

With continued reference to FIG. 2, for the purposes of this disclosure, a "container" is an executable package of software image 220 that includes all necessary elements needed to run it in any SOE. As a nonlimiting example, at least a container 244 may include code, runtime, system tools, system libraries, configurations, and/or the like. In some cases, at least a container 244 may provide a "second layer" isolation or protection from virtual environment 128 and other containers 244 and/or partitions 132a-n. In one or more embodiments, at least a container 244 may include a standard unit of software that packages up code and all its dependencies so an integrated software module 240 may run under a desired performance from one SOE to another. In some cases, at least one container 244 may be created based on a software image 220 as described above. As a nonlimiting example, first partition 132a may include a container manager 248. For the purposes of this disclosure, a "container manager" is a component used to manage and/or orchestrate a plurality of containers 244. In some cases, each partition 132a-n of plurality of partitions 132a-n, especially in second partition 132b, may include a containerized application environment. In some cases, container manager 248 may be configured to create and further deploy one or more containers 244 on second partition 132b. In some cases, a plurality of containers 244 may be run simultaneously. In one or more embodiments, a container manager 248 may include an engine that provide at least an operating system e.g., CentOS, Debian, Fedora, RHEL, Ubuntu, Windows, MacOS, and/or the like, wherein the engine may enable one or more containers 244 to run in any partition 132a-n or virtual environment 128 consistently. In some cases, a container manager 248 may be configured to validate the authenticity of software images 220, load container executables into container environments, connect container environments to operating service, and/or export management APIs to other system management tools. In some cases, each partition 132a-n may include a container manager 248, and a plurality of container managers 248 of a plurality of partitions 132a-n may be (indirectly) communicative with each other. In some cases, a container manager 248 at second partition 132b and/or third partition 132c may be known as "container agent". As a nonlimiting example, software image 220 may become a container 244 at runtime-when it is running on a container agent.

With continued reference to FIG. 2, for the purposes of this disclosure, a "non-preemptible container runtime" is a runtime that cannot be interrupted or preempted by another processor 108 once at least one container 244 is up and running. In some cases, where at least one container 244 is running at a RTOS, a certain level of service or response time may be guaranteed. As a nonlimiting example, at least one container 244 may be granted access to at least a processor 108, memory 112, and other resources, as described above, according to partition policy 216 based on its priority. Once a software module 240 is running, it may have exclusive access to dedicated resources until it completes execution or a reaches a conclusion of dedicated execution time slice 228, as described above. As a nonlimiting example, at least one operational rule 224 of software image 220 may specify one or more safety-critical tasks which must not be delayed or interrupted by other non-critical tasks running on other partitions 132a-n. Exemplary embodiments of at least one container 244 may include a DOCKER container that encapsulate any payload and dependencies into a single object, a RTOS container, a safety-certified container designed to meet stringent certification requirements of regulatory bodies such as, without limitation, FAA or EASA, among others. As a nonlimiting example, software image 220 may capture an FMS module, wherein the FMS module may be configured to perform critical functions related to navigation and flight planning defined by its operational rule 224. Such FMS module may be instantiated within a container in second partition 132b and run with a non-preemptible runtime to ensure that navigation calculations and related data processing are not interrupted to maintain safety of flight operations.

With continued reference to FIG. 2, in one or more embodiments, instantiating software image 220 into at least one container 244 may include extracting software metadata 252 from software image 220. Software metadata 252 may include a plurality of software configuration parameters 256 and a plurality of digital files 264. For the purposes of this disclosure, "software metadata" is information related to software image 220. As a nonlimiting example, software metadata 252 may include a manifest file specifying a software version number, required dependencies, configurations, and/or the like. For the purposes of this disclosure, "software configuration parameters" are parameters that dictate how software image 220 should be set up within a particular SOE. Exemplary software configuration parameters 256 may include without limitation one or more environment variables, service endpoints, port numbers, paths to necessary libraries or dependencies, and/or other configuration data that may be necessary for a software module 240 to run correctly within second partition 132b. In some cases, at least a processor 108 may configure a container manager 248 within first partition 132a, through virtualization layer 208, to initialize at least one container 244 within second partition 132b, as a function of a plurality of software configuration parameters 256 by preparing container environment, i.e., non-preemptible container runtime 260, based on the one or more software configuration parameters 256. This step may be done, for example and without limitation, by setting up correct file paths, configuring virtual network settings, installing required libraries, and/or the like, based on a plurality of software configuration parameters 256. Integrating software module 240 may further include deploying a plurality of digital files 264 within the initialized container 244. For the purposes of this disclosure, "digital files" are a set of files each containing at least a portion of at least one operational rule 224. In some cases, a plurality of digital files 264 may include any files that are necessary for the operation of an integrated software module 240. As a nonlimiting example, plurality of digital files 264 may include one or more executable files, libraries, scripts, certificates for securities, data files, and/or the like. Container manager 248 may place plurality of digital files 264 in correct directories, setting permission, and/or prepare container agent to execute plurality of digital files. In some cases, container agent may load at least one operational rule 224 into a non-preemptible container runtime 260. As a nonlimiting example, at least one operational rule 224 may govern how a software image 220 may operate within at least one container 244 and second partition 132b, e.g., interaction with other software applications, utilization of dedicated resources, and/or response to certain events, among others.

With continued reference to FIG. 2, in some cases, second partition 132b may include a third-party application with a proprietary runtime environment. For the purposes of this disclosure, a "third-party application" is a software application developed by an entity other than a primary system vendor or integrator. In some cases, third-party applications may include additional, potentially non-essential functions and may not be part of a core system software. In some cases, a third-party application may require a specific runtime environment to function, also known as the "proprietary runtime environment". In some cases, a proprietary runtime environment may include one or more libraries, services, and/or other dependencies that are unique to applications and not necessarily shared with other parts of the system. In one or more embodiments, a proprietary runtime environment may operate within second partition 132b and may be prevented from interfering with the runtime environment of other partitions 132a-n. In some cases, proprietary runtime environment may be provided by at least one container 244. As a nonlimiting example, primary control system may operate in first partition 132a while in-flight entertainment applications (i.e., third-party application with its proprietary runtime) may operate in second partition 132b, which may be hosted in at least one container 244, given a dedicated set of resources and may only communicate with rest of system e.g., first partition 132a in pre-defined ways that do not jeopardize integrity or security of flight systems. In such embodiments, a hypervisor 148 may be configured to maintain strict isolation between partitions 132a-n while allowing necessary levels of communication for the system to function as a whole.

With continued reference to FIG. 2, in some cases, plurality of partitions 132a-n may include a plurality of third partitions 132c. For the purposes of this disclosure, a "third partition" is another isolated and encapsulated space within virtual environment 128 designed to run specific services. In some cases, services may include APIs, libraries calls, system calls, and/or other functionalities that may be required by second partition 132b and/or first partition 132a. In one or more embodiments, plurality of third partitions 132c may include one or more service VMs, wherein the service VMs are dedicated VMs (similar to first partition 132a and second partition 132b as described above) that runs background services necessary for the operation of system or integrated software module 240. In some cases, services may not interface directly with second partition 132b and/or its end-user. In some cases, services may also include monitoring, and other platform-level functions. In one or more embodiments, third partition 132c may include a platform service segment (PSS) 268. In some cases, PSS 268 may include a replica of PSSS as implemented in FACE, consistent with details described above. In some cases, PSS 268 may include at least one platform service that provides one or more core functionalities to a host OS or each non-preemptible container runtime 260, as described above. As a nonlimiting example, a PSS 268 may be configured as a fundamental layer of services upon which integrated software module 240 may rely. As a nonlimiting example, each third partition 132c of plurality of third partitions 132c may include a distinct program executive office (PEO) aviation service. In some cases, PEO aviation service may include one or more aspects tailored to support specific needs of army aviation, possibly including logistical service, communication service, navigation service, or the like. In some cases, each third partition 132c within a plurality of third partitions 132c may be isolated from each other i.e., each service running within its partition 132a-n cannot be compromised by activities in other partitions 132a-n, including without limitation second partition 132b. In other cases, service may further include hardware interfacing services, such as without limitation services communicating with sensors and actuators, to software services e.g., database management, network configuration, security services, and/or the like.

With continued reference to FIG. 2, in one or more embodiments, one or more third partitions 132c may together serve as an interface layer that allows different integrated software to communicate with each other. As a nonlimiting example, third partitions 132c may include APIs that allow integrated software to access platform services, e.g., databases, networking, hardware interfacing, and/or the like, as described above, without having to manage them directly. In one or more embodiments, one or more third partitions 132c may include libraries (i.e., collections of pre-written code that a software application can call upon to perform specific pre-configured tasks). As a nonlimiting example, third partitions 132c may include one or more cryptographic functions imported into the system for secure communications for second partition 132b. In one or more embodiments, a plurality of third partitions 132c may include one or more tools, such as without limitation compilers, debuggers, monitoring systems, or other software utilities, that support the development, deployment, and maintenance of software image 220 in second partition 132*b*. In one or more embodiments, a third partition 132*c* may be configured as a middleware that lies between first partition 132*a* and second partition 132*c*, providing services to integrated software module 240 beyond those available from first partition 132*a*. As a nonlimiting example, a third partition 132*c* as a middleware may handle services such as message queuing, transaction management, and/or coordination of distributed systems, among others. In such embodiments, a third partition 132*c* may act as a facilitator for communication and data management for second partition 132*b*. In some cases, a plurality of third partitions 132*c* may work as a "back-end system" for second partition 132*b* and/or first partition 132*a*, which may be "front-end" where users or operational interactions occurs. In some other cases, a first partition 132*a* may include a brokerage service for integrated software module 240, ensuring that data is passed correctly between different third partitions 132*c*. In some cases, a plurality of third partitions 132*c* may be built into virtual environment 128. As a nonlimiting example, when hypervisor 148 is being first instantiated, the hypervisor 148 may be configured to create one or more third partitions 132*c* according to pre-defined configurations. Specific services may be imported or exported as needed. Configuration request 212 may include a request for loading new services when software module 240 starts or becomes ready to run. In some cases, services within plurality of third partitions 132*c* may be updated through a secure update process that is tightly controlled by first partition 132*a* to prevent introduction of vulnerabilities or errors.

With continued reference to FIG. 2, at least a processor 108, in some cases where a multi-core processor is used, as described above, the multi-core processor may be configured to distribute the operation of first partition 132*a* to a first core of a plurality of cores and operate second partition 132*b* using a second core of the plurality of cores. In some cases, a first partition 132*a*, e.g., a management VM, may be assigned to operate on a first core, whereas a second partition 132*b*, e.g., an application VM, may be assigned to operate on second core. In some cases, both partitions 132*a-n* may be run in parallel without affecting the performance of any other partition 132*a-n*. In some cases, such hardware isolation may prevent faults in one partition 132*a-n* from affecting another, which is crucial in an SCOE. As a nonlimiting example, plurality of second partitions 132*b* may be distributed to a plurality of cores. In some cases, a second partition A may be configured to run a flight control system, while second partition B may be running non-critical tasks, e.g., in-flight entertainment, wherein the entertainment system may never interfere with flight controls. In some cases, at least a processor 108 may allocate different cores to different partitions 132*a-n* based on current load and performance requirement. In some cases, hypervisor 148 may be responsible for managing distribution of partitions 132*a-n* across a plurality of virtual cores through virtualization layer 208. In other cases, at least a processor 108 may employ core affinity settings, wherein certain tasks are "affined" or fixed to specific cores to prevent them from being shifted around, which may lead to variability in performance. Additionally, and/or alternatively, a plurality of third partitions 132*c* may also be configured to operate on a designated set of cores.

With continued reference to FIG. 2, in some cases, virtualization layer 208 may include a virtual bus 272. For the purposes of this disclosure, a "virtual bus" is a software construct that mimics the functionality of a physical bus. In one or more embodiments, an I/O virtual bus 272 may include a virtualization of I/O physical bus that facilitates communication between different components within virtual environment 128 or even different virtual environments 140. As a nonlimiting example, virtual bus 272 may connect a first partition 132*a* with a second partition 132*b*. In some cases, a management VM (i.e., a first partition 132*a*) may send one or more administrative commands to a software module 240 (i.e., second partition 132*b*). Additionally, and/or alternatively, a virtual bus 272 may also connect first partition 132*a* with a plurality of third partitions 132*c*, allowing a management VM to communicate with other ancillary and/or service-oriented partitions 132*a-n*, as described above. A virtual bus 272 may be set up in such a way that second partition 132*b* is isolated from direct communication with a plurality of third partitions 132*c*; this means that any communication to or from a software module 240 in the second partition 132*b* must go through first partition 132*a*. In this case, a software application running on second partition 132*b* may not be able to directly access or be accessed by one or more services or functions running on a plurality of third partitions 132*c*. As a nonlimiting example, a plurality of third partitions 132*c* may include various utility services e.g., logging, diagnostics, communication, backup services, among others, wherein virtual bus 272 may ensure that second partition 132 e.g., a flight navigation system, may only communicate with a controller, i.e., a management VM, and not directly with other utility services which may be less secure.

With continued reference to FIG. 2, in some cases, first partition 132 may include a logging mechanism 276. For the purposes of this disclosure, a "logging mechanism" is a system or process that systematically records events, transactions, and/or other significant observations, that occur within a software system. Such software system may include an integrated software module 240, e.g., a software image 220 with a non-preemptible container runtime 260. In some cases, a logging mechanism 276 may be integrated directly into a first partition 132*a* or any other partition 132*a-n* that may be responsible for system management; in other words, at least one third partition 132*c* of plurality of third partitions 132*c* may include an implementation of logging mechanism 276. In some cases, at least a processor 108 may implement a plurality of logging mechanisms 276, each of which may be designated to monitor a particular event or activity with a non-preemptible container runtime 260. In some cases, a logging mechanism 276 may include privileges to monitor all system activities in addition to those within the non-preemptible container runtime 260. In one or more embodiments, logging mechanism 276 may monitor second partition 132*b* through virtual bus 272, e.g., a communication channel that transmits data and events to be logged while maintaining isolation between partitions 132*a-n* within virtual environment 128. As a nonlimiting example, logging mechanisms 276 may be configured to log start and stop times (e.g., when container 244 or containers 244 begin and end execution), resource usage (e.g., CPU, memory, I/O usage), security events (e.g., any authentication attempts, access control violations, or any other security relevant events), errors (e.g., errors thrown by container 244 such as indicator of security concerns and operational issues), system calls (e.g., calls made from the container to host OS or from host OS to plurality of third partitions 132*c*), and/or the like. In some cases, data and event to be logged may be received from container manager 248. Container manager may be continuously or periodically monitoring other container agents in partitions 132*a-n*. As another nonlimiting example, logging mechanism 276 may be configured to record detailed operation data for post-flight analysis and incident investigation. In some cases, logging mechanism 276 may include a data logging PSSS implemented from PEO Aviation Enterprise Architecture (EA) and FAF v4.0 interfaces.

With continued reference to FIG. 2, in one or more embodiments, host circuit 204 may be configured to initiate a secure boot process when the system is powered on or restarted. In some cases, host circuit 204 may include a trusted platform module (TPM). For the purposes of this disclosure, a "trusted platform module" is a specialized chip on an endpoint hardware component or device that stores keys. Such keys may include without limitation cryptographic keys such as without limitation encryption keys, decryption keys, public keys, private keys, or any key as described in this disclosure without limitation. As a nonlimiting example, host circuit 204 may include a plurality of TPMs, each containing an RSA key pair known as "Endorsement key (EK)", wherein the RSA key pair may be maintained inside of a TPM and cannot be accessed by software module 240 (i.e., second partition 132b). In some cases, first partition 132a may include a bootloader (i.e., the first piece of software that runs). In some cases, bootloader may be verified. As a nonlimiting example, one or more system firmware may be configured to check bootloader's digital signature before execution using keys, e.g., public keys stored in a TPM or another secure component. In case where a bootloader's signature doesn't match, host circuit 204 may halt, preventing potential malicious partitions 132a-n from running. Once bootloader is verified and executed, hypervisor 148 may be instantiated, as described above. In some cases, hypervisor 148 may also be verified through an associated digital signature to ensure its authenticity. As a nonlimiting example, host circuit 204 may boot only with trusted and authenticated partitions 132a-n, e.g., first partition 132a and/or plurality of third partitions 132c. Second partition 132b may be verified before loading, or trusted version of second partition 132b may be loaded. Hypervisor 148 may be configured to prevent any second partition 132b that yields a negative response during verification. In some cases, all events during the secure boot process, as described herein, including without limitation any verification failures or anomalies, can be communicated to first partition 132a through virtual bus 272 and logged by logging mechanism 276, as described above. In some cases, these events may be alerted to certain users, e.g., administrators. Additionally, or alternatively, in cases where verification fails, host circuit 204 may be configured to boot into a safe mode, attempting to restore a trusted software version, or simply halting at least a processor 108 and/or first partition 132a to prevent potential threats.

With continued reference to FIG. 2, for the purposes of this disclosure, a "digital signature" is a secure proof of possession of a secret by a signing device, as performed on a provided element of data, known as a "message". A message may include an encrypted mathematical representation of a file or other set of data using the private key of a public key cryptographic system. In some cases, a digital signature may be a secure proof. For the purposes of this disclosure, a "secure proof" is a protocol whereby an output is generated that demonstrates possession of a secret, such as a device-specific secret, without demonstrating the entirety of the device-specific secret; in other words, a secure proof by itself may be insufficient to reconstruct the entire device-specific secret, enabling the production of at least another secure proof using at least a device-specific secret. In some cases, a secure proof may be referred to as a "proof of possession" or "proof of knowledge" of a secret. Where at least a device-specific secret includes a plurality of secrets, such as a plurality of challenge-response pairs, a secure proof may include an output that reveals the entirety of one, but not all, of the plurality of secrets. As a nonlimiting example, a secure proof may include a response contained in one challenge-response pair. In one or more embodiments, proof may not be secure; in other words, a proof may include a one-time revelation of at least a device-specific secret, for instance as used in a single challenge-response exchange.

With continued reference to FIG. 2, in an embodiment, a secure proof may be implemented using a challenge-response protocol. In one or more embodiments, this may function as a one-time pad implementation. As a nonlimiting example, at least a processor 108 or first partition 132a may record a series of outputs ("responses") produced by a partition 132a-n possessing secret information, given a series of corresponding inputs ("challenges"), and store them securely. In one or more embodiments, a challenge-response protocol may be combined with key generation. A single key may be used in one or more digital signatures, such as without limitation signatures used to verify second partition 132b. The key may be discarded for future use after a set period of time. Secure proof may include encryption of a challenge to produce the response, indicating possession of a secret key. Encryption may be performed using a private key of a public key cryptographic system or using a private key of a symmetric cryptographic system. As a nonlimiting example, a first partition 132a may verify a response from a second partition 132b by decrypting an encryption of challenge or of another datum using either a symmetric or public-key cryptographic system, as described above, verifying that a stored key matches the key used for encryption as a function of at least a device-specific secret. Keys may be generated by random variation in selection of prime numbers, such as without limitation for the purposes of a cryptographic system, e.g., RSA, that relies prime factoring difficulty. Keys may be generated by randomized selection of parameters for a seed in a cryptographic system, such as elliptic curve cryptography, which is generated from a seed. Keys may be used to generate exponents for a cryptographic system, such as without limitation Diffie-Helman or ElGamal, that are based on a discrete logarithm problem.

With continued reference to FIG. 2, in some cases, a digital signature may be verified by first partition 132a and/or at least a processor 108, using a verification datum suitable for verification of a secure proof. As a nonlimiting example, where a secure proof is enacted by an encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to a possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as without limitation a hashing algorithm as described above. A mathematical representation to which a signature may be compared may be included with the signature, for verification purposes. In one or more embodiments, the algorithm used to produce the mathematical representation may be publicly available, permitting the easy reproduction of the mathematical representation corresponding to any file.

With continued reference to FIG. 2, in some embodiments, digital signatures may be combined with or incorporated in digital certificates. For the purposes of this disclosure, a "digital signature" is a file that conveys information and links the conveyed information to a "certificate authority (CA)" that is the issuer of a public key in a public key cryptographic system. In one or more embodiments, a certificate authority may contain data conveying the certificate authority's authorization for the recipient to perform a task. The authorization may include an authorization to access a given datum. The authorization may include an authorization to access a given process. In one or more embodiments, a digital certificate may identify certificate authority. A digital certificate may include a digital signature. In some embodiments, a third party, such as a certificate authority, may be available to verify that the possessor of the private key is indeed a particular entity; thus, if the certificate authority may be trusted, and the private key has not been stolen, the ability of an entity to produce a digital signature may confirm the identity of the entity and links the file to the entity in a verifiable way. A digital signature may be incorporated in a digital certificate. For the purposes of this disclosure, a "digital certificate" is a document authenticating an entity possessing a private key by authority of an issuing certificate authority and signed with a digital signature created with that private key and a mathematical representation of the remainder of the certificate. In other embodiments, a digital signature may be verified by comparing the digital signature to one known to have been created by the entity that purportedly signed the digital signature; for instance, if the public key that decrypts the known signature also decrypts the digital signature, the digital signature may be considered verified. A digital signature may also be used to verify that the file has not been altered since the formation of the digital signature.

With continued reference to FIG. 2, in some cases, second partition 132b and/or one or more third partition 132c may be hosted in a cloud environment, remote to virtual environment 128 and/or first partition 132a. In an embodiment, apparatus 100 may leverage cloud-native technologies or hybrid cloud models to enhance scalability. As a nonlimiting example, a dedicated set of resources configured to run a specific software, a container 244, and/or other services such as without limitation VMs, containers, cloud services, and/or the like, in cloud, e.g., AWS, MICROSOFT AZURE, and/or the like, may be analogues to second partition 132b as described herein. As a nonlimiting example, AWS EC2 may offer one or more computer abstractions from VMs and/or containers 244 e.g., KUBERNETE. In such embodiments, a software module 240 may be deployed to cloud infrastructure. In one or more embodiments, Zero-Knowledge proof may allow a second partition 132b to prove to a first partition 132a that a given response, e.g., an execution of at least one operational rule 224, is true and authenticated. As a nonlimiting example, first partition 132a may perform one or more remote attestation protocols, e.g., TPM attestations, wherein an entity may prove to a remote entity that its components, e.g., firmware and/or software, is trustworthy without disclosing specific details about the response, operational rule 224, cryptographic keys, firmware, and/or software. In some cases, any sensitive or proprietary information related to second partition 132b may be verified to ensure it's running the correct software module 240 and hasn't been tampered with, all without revealing the specifics of such software module 240. As a nonlimiting example, first partition 132a may be configured to utilize KUBERNETES to automatically deploy and manage software module 240 in a cloud-based second partition 132b.

With continued reference to FIG. 2, for the purposes of this disclosure, a "zero-knowledge proof" is a proof or output that demonstrates a possession of a secret while revealing none of the secret to a recipient of the proof or output. A zero-knowledge proof may be information-theoretically secure, meaning that an entity with infinite computing power would be unable to determine secret from output. Alternatively, a zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P", which is used to prove computational integrity and/or possession of a secret, and a verifier algorithm, or "V", whereby an entity may check the validity of P. A zero-knowledge proof may include an interactive zero-knowledge proof, wherein an entity verifying the proof, e.g., via a verifying partition, must directly interact with the proving entity e.g., via a proving partition. As a nonlimiting example, the verifying and proving partitions may be required to be online or connected to the same network as each other at the same time. As a nonlimiting example, this may be enabled, at least in part, by a virtualization layer 208 and/or a virtual bus 272, as described above. In some cases, an interactive zero-knowledge proof may include a "proof of knowledge" proof, such as a Schnorr algorithm for proof on knowledge of a discrete logarithm. In a Schnorr algorithm, a prover may commit to a randomness, r, generate a message based on r, and generate a message adding r to a challenge c multiplied by a discrete logarithm that the prover is able to calculate. Verification is then performed by a verifier who may produce c by exponentiation, thus checking the validity of the discrete logarithm. An interactive zero-knowledge proof may alternatively, and/or additionally, include sigma protocols. A person of ordinary skill in the art, upon reviewing the entirety of this disclosure, will be aware of various alternative interactive zero-knowledge proofs that may be implemented consistently with this disclosure.

With continued reference to FIG. 2, alternatively, zero-knowledge proof may include a non-interactive zero-knowledge proof, or a proof wherein neither entity to the proof interacts with the other entity to the proof. As a nonlimiting example, a verifying partition receiving a proof and a proving partition providing the proof may receive a reference datum which the partition providing the proof may modify or otherwise use to perform the proof. As a nonlimiting example, a zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key. Suitable public key cryptographic system may include without limitation RSA, elliptic curve cryptography, ElGamal, or any other suitable public key cryptographic system. Generation of a trusted setup may be performed using a secure multiparty computation so that no one entity has control of the totality of the secret information used in the trusted setup. As a result, if any one partition generating the trusted setup is trustworthy, the secret information may be unrecoverable by malicious parties. As another nonlimiting example, a non-interactive zero-knowledge proof may include a Succinct Transparent Arguments of Knowledge (ZK-STARKS) zero-knowledge proof. In one or more embodiments, a ZK-STARKS proof may include a Merkle root of a Merkle tree representing evaluation of a secret computation at some number of points, which may be 1 billion points, plus Merkle branches representing evaluations at a set of randomly selected points of the number of points. Verification may include determining that provided Merkle branches match the Merkle root and that point verifications at those branches represent valid values, wherein validity may be shown by demonstrating that all values belong to the same polynomial created by transforming the secret computation. In one or more embodiments, ZK-STARKS may not require a trusted setup.

With continued reference to FIG. 2, a zero-knowledge proof may include any other suitable zero-knowledge proof. Suitable zero-knowledge proof may include without limitation bulletproofs. Zero-knowledge proof may include without limitation a homomorphic public-key cryptography (hPKC)-based proof. Zero-knowledge proof may include without limitation a discrete logarithmic problem (DLP) proof. Zero-knowledge proof may include without limitation a secure multi-party computation (MPC) proof. Zero-knowledge proof may include without limitation an incrementally verifiable computation (IVC). Zero-knowledge proof may include without limitation an interactive oracle proof (IOP). Zero-knowledge proof may include without limitation a proof based on the probabilistically checkable proof (PCP) theorem, including a linear PCP (LPCP) proof. A person of ordinary skill in the art, upon reviewing the entirety of this disclosure, will be aware of various forms of zero-knowledge proofs that may be used, singly or in combination, consistently with this disclosure.

With continued reference to FIG. 2, additionally, or alternatively, first partition 132a may include a health manager 280. For the purposes of this disclosure, a "health manager" is a component that actively checks the state of various system components to ensure the overall system is functioning correctly. In some cases, health manager 280 may be implemented in a way tailored to fault management and recovery strategies. In some embodiments, health manager may be configured to continuously observe operational status of both hardware components (e.g., host circuit 204, at least a processor 108, sensors connected to the processor 108, memory 112, and/or the like) and software components (e.g., software module 240, plurality of third partitions 132c, host OS, and/or the like) and check integrity of data and software running within partitions 109a-c to ensure they are not corrupted or behaving erratically. In some cases, logging mechanism 276 may communicate with health manager 280 directly to record significant observations (e.g., recurring issues). In some cases, health manager 280 may perform one or more diagnostic checks to identify any potential issues. As a nonlimiting example, a health manager 280 may be configured to run self-tests or health checks at regular intervals or upon system boot-up. In some cases, diagnostic checks may be performed during secure boot, as described above. In one or more embodiments, health manager 280 may generate one or more alerts or warnings when it detects issues that may impact system performance and/or safety. In some cases, one or more pre-defined rules may be used to escalate issues to appropriate level of attention, potentially triggering failover and/or redundancy mechanisms, if necessary, wherein pre-defined rules may be stored in database or a third partition 132c, as described above. As a nonlimiting example, health manager 280 may include a real-time system health monitoring system configured to check operational readiness or one or more aircraft's avionics systems before takeoff and/or during flight, manage any in-flight anomalies, and support maintenance crew in identifying and resolving issue between flights. In some cases, health manager may include an aircraft system monitoring PCS, security event audit FACE PSSS, user authentication FACE PCS, operational mode management PCS, and/or the like implemented from PEO Aviation Enterprise Architecture (EA) and FAF v4.0 interfaces.

With continued reference to FIG. 2, at least a processor is configured to verify a compliance 284 of integrated software module 240 with a plurality of pre-determined safety standards 288. Such pre-determined safety standards 288 may be sourced from a trusted repository 292. This verification step may be implemented by monitoring an adherence of software module 240 to pre-defined operational rule 224 within non-preemptible container runtime 260 at first partition 132a. For the purposes of this disclosure, a "compliance" is a data element measuring a conformance of software module 240 to established guidelines or specifications. These guidelines or specifications are known as "safety standards" and are designed to ensure the safety and reliability of software module 240. Such compliance 284 may be especially important within environments where failure may lead to significant harm or loss. In some cases, compliance 284 may include a quantitative value such as a score or a range of scores. In other cases, compliance 284 may include one or more binary representation, for example, "1" and "0" or "TRUE" and "FALSE", wherein "1/TRUE" may indicate that a software module 240 is compliant with at least one corresponding safety standard, and "O/FALSE" may indicate that the software module 240 is non-compliant with the at least one corresponding safety standard. For the purposes of this disclosure, a "trusted repository" is a trusted entity wherein plurality of safety standards 288 are kept. Such trusted entity may include without limitation a secure storage and/or even a trusted (third) partition 132c. As a nonlimiting example, trust repository 292 may be considered authoritative and tamper-proof and may include without limitation one or more secure databases, version control systems, and/or certified data centers. In one or more embodiments, at least a processor 108 may be configured to evaluate compliance 284 to ensure that an integrated software module 240 may perform all functions specified by at least one operational rule 224. As a nonlimiting example, at least a processor 108 may be configured to determine a design assurance level (DAL) classification associated with an integrated software module 240 or a DAL classification based on container runtime behaviors observed by container agent, container manager 248, health manager 280, and/or data record generated and managed by logging mechanism 276 (in real-time or near real-time).

With continued reference to FIG. 2, for the purposes of this disclosure, a "design assurance level (DAL) classification" is a labelling process within a software based on the effects caused by a failure of a software module 240. For example, and without limitation, a software failure associated with a first software module which can potentially put human lives at risk may receive a particular classification, whereas a software failure associated with a second software module which may, at most, slightly injure an individual may be given a differing classification. In one or more embodiments, each integrated software module may be associated with a particular DAL. DAL classification may range from A-E; a DAL-A classification may indicate that software module 240 may cause death during failure, whereas as a DAL-E classification may indicate that there is no potential harm in the event of a software failure. In one or more embodiments, various software modules may be given classifications based on their inherent risk to cause harm to individuals. In one or more embodiments, the DAL of a software may indicate that one software module may require more frequent testing, more stringent safety protocols, and/or the like, in comparison to other software modules. As a nonlimiting example, a DAL-E classified software module may not require frequent testing as failure may not harm individuals, whereas a DAL-A classified software may require stringent testing to ensure that failure does not occur. In one or more embodiments, each DAL classification may contain minimum resource requirements such as without limitation minimum processing power, minimum space allocation, and/or the like. As a nonlimiting example, compliance 284 of software module 240 may be derived, at least in part, from determined DAL classification. In one or more embodiments, software data may contain DAL certification of at least one container 244.

With continued reference to FIG. 2, in some cases, compliance 284 may include an assessment of software module 240 regarding its conformance to at least one operational rule 224 that dictates the behavior of the software module 240, known as the "adherence". As a nonlimiting example, at least one operational rule 224 may dictate how it must perform under various conditions to be considered compliant. As a nonlimiting example, at least a processor 108 may be configured to verify the execution of software module 240. In some cases, at least a processor 108 may assign a high score to a software module 240 which executed without interference, e.g., functions within its runtime without being interrupted or influenced by other processes or partitions 132a-n, maintaining strict timing and performance as per its safety standards. In another nonlimiting example, at least a processor 108 may be configured to check the integrity of data processed, e.g., software metadata 252 and/or data transmitted by software module 240 using one or more error-checking algorithm or secure data transmission protocols. In some cases, compliance 284 may include DO-178C for avionics, ISO 26262 for automotive safety, IEC 61508 for industrial system safety, and/or the like. In some cases, a high compliance 284 may indicate that a software module 240 adheres to standards, e.g., RTCA/DO-178C for software in airborne systems. In some cases, compliance 284 may include a certification of ISO 27001. As a nonlimiting example, a software module 240 such as a flight control system software may be rigorously tested and verified against DO-178C standard based on observed runtime behaviors through simulation and/or in-flight testing.

With continued reference to FIG. 2, in some cases, first partition 132a or at least a third partition of plurality of third partitions 132 may include a dedicated verification module implementing one or more compliance algorithms, configured as a "watchdog", that continuously monitors the adherence of software module 240 to assess compliance 284. In some cases, verification module may have access to trusted repository 292 containing plurality of pre-defined safety standards 288, which may include without limitation DO-178C for software in airborne systems, ISO26262 for automotive safety, DO-297 for supply chain management, and/or the like. In some cases, verification module may be configured to compare non-preemptible container runtime behavior against one or more above listed pre-defined safety standards in real-time; for instance, and without limitation, this may include checking for correct execution of operational rule 224, proper use of system resources such as dedicated execution time slice 228, private static memory space 232, and/or the like, adherence to security protocols, among others. As a nonlimiting example, verification module may communicate with health manager 280 and/or logging mechanism 276 to monitor a wealth of data recorded. In some cases, verification module may be configured to analyze (e.g., using statistical methods or one or more machine-learning algorithms as described herein) to detect any deviations from expected behaviors as defined by one or more safety standards 288. As a nonlimiting example, verification module may include one or more machine-learning models. Additionally, and/or alternatively, one or more machine-learning models may be trained to predict expected runtime behaviors and/or detect anomalies indicating potential compliance issue. Additionally, or alternatively, a signature-based verification may be employed by verification module, which may use signatures or models created based on compliant behaviors against actual operational data and/or software metadata 252.

With continued reference to FIG. 2, in some cases, virtual environment 128 may further include or otherwise implement a software-defined intelligent network (SDIN). For the purposes of this disclosure, "Software Defined Intelligent Networking (SDIN)" is an advanced approach to network management that combines the principles of Software-Defined Networking (SDN) with intelligent technologies including without limitation artificial intelligence (AI) and machine learning (ML). The primary goal of SDIN is to enhance the control, automation, and optimization of network infrastructure by making it more dynamic, adaptable, and intelligent. It enables real-time analysis, proactive management, and dynamic optimization, making networks more efficient, reliable, and secure. This approach may be particularly useful in environments where flexibility, scalability, and performance optimization are critical, such as without limitation telecommunications, cloud computing, and IoT systems. For the purposes of this disclosure, "Software-Defined Networking (SDN)" is a network architecture approach that separates the control plane that makes decisions about where traffic is sent from the data plane that forwards traffic to the selected destination. This separation allows for centralized control and dynamic management of network resources through software, making the network more flexible, programmable, and adaptable to changing needs.

With continued reference to FIG. 2, in one or more embodiments, an SDIN may be a "smart" networking layer that may dynamically manage the connectivity and data flow between different system components, applications, partitions, and/or the like, based on certain criteria. Such criteria may include without limitation compliance 284 of integrated software module 240. In some cases, SDIN may include a network controller that controls communication between a plurality of partitions 132a-n within virtual environment 128 through virtualization layer 208 and/or hypervisor 148. In some cases, an SDIN may dynamically alter the connectivity between system components based on predefined rules, operational requirements, and/or real-time assessments such as compliance 284. In some cases, an SDIN may be configured to enforce one or more network polices that dictate how partitions 132a-n may interact, what bandwidth may be allocated, which partitions 132a-n may be permitted to communicate, and/or the like. In some cases, SDIN may communicate with container manager 248 that continuously monitors the activity of each partition 132a-n, and adjust connections between a plurality of partitions 132a-n. In some cases, adjusting connections between plurality of partitions may be based on a compliance matrix, as described in detail above. As a nonlimiting example, a network controller may be configured to selectively connect and/or disconnect partitions 132a-n as a function of a compliance matrix (e.g., compliance status). If a second partition 132b is found to be non-compliant with one or more safety standards 288, a network controller of SDIN may selectively disconnect or isolate the second partition 132b from the rest of system to prevent potential harm or interference with compliant partitions 132a-n (e.g., first partition 132a and plurality of third partitions 132c). In some cases, adjustments of connectivity may include reconfiguring and/or updating second partition 132b to bring it back to compliance before restoring its connectivity. This step may be implemented, for example and without limitation, through one or more rollback operations which may return second partition 132b to a previous compliant state.

With continued reference to FIG. 2, in one or more embodiments, an SDIN may employ a machine-learning module which may implement one or more machine-learning algorithms to predict and respond to network needs, detect anomalies that may indicate non-compliance, and/or automatically reconfigure connections for desired performance and safety, etc., consistent with details described elsewhere in this disclosure. As a nonlimiting example, one or more machine-learning models may be generated by a machine-learning module within an SDIN to predict potential compliance violations and proactively adjust connections before actual violations occur. In some cases, when a second partition 132b becomes non-compliant, an SDIN may automatically initiate procedure to bring it back into compliance, such as without limitation by triggering a security scan for vulnerabilities, or via a configuration update as described above. As a nonlimiting example, in an avionics system designed with modular architecture as described herein, each second partition 132b of a plurality of second partitions 132b integrated into the system may perform a distinct function—navigation, communication, in-flight entertainment, weaponry, and/or the like. These partitions 132a-n may be interconnected by a virtual bus 272, as described above, wherein SDIN may have privileges to configure a hypervisor 148 to manage virtual bus connection between a plurality of partitions 132a-n within virtual environment 128, through virtualization layer 208. During a routine check, SDIN may detect that in-flight entertainment system may be running outdated software that may have one or more vulnerabilities. In order to prevent any potential risk to aircraft's operations, an SDIN may be configured to immediately disconnect in-flight entertainment system so that it may no longer communicate with navigation or communication modules. In some cases, an SDIN may reroute passenger devices to a limited network that keeps them disconnected from main avionics but allows for basic functionality, such as without limitation internet browsing capabilities. In some cases, a machine-learning module may lean from historical incidents and update one or more predictive machine-learning models to better anticipate potential compliance lapses. In other cases, users, e.g., pilots, technicians, network administrators, passengers, and/ or the like, may provide user feedback to support SDIN's decision making; for example, user may choose to trust or not to trust a software module 240. In some cases, a machine-learning module may adapt to user feedback to adjust the parameters therein, thereby reducing false positives or becoming more aligned with user expectations and expertise.

With continued reference to FIG. 2, additionally, or alternatively, an SDIN may be configured to direct traffic on a network. In contrast to hardware components such as routers, which may control a network through hardware, an SDIN may be used to dynamically control a network through an integrated software module 240. In one or more embodiments, SDIN may be used to control a network, wherein data packets may be routed using the SDIN. In one or more embodiments, an SDIN may act as an intermediary between a software application or software and a network, wherein the SDIN may control how a software module 240 interacts with the network. In some cases, an SDIN may be used to monitor and control network conditions. In one or more embodiments, an SDIN may be used to manage network resources for at least one container 244. In some cases, at least one container 244 may be limited in network resources due to their level of importance, such that a container 244 running a less important software image 220 does not crowd a network for less important matters. As a nonlimiting example, an SDIN may ensure an enablement of one or more dynamic mesh networks, and facilitate assured, secure data sharing across Link-16, BFT, 4586, and RAC2.

With continued reference to FIG. 2, in some embodiments, memory 112 may include one or more caches as described above, containing one or more cache entries. For the purposes of this disclosure, a "cache entry" is a single storage location within a cache. In some cases, each entry in cache may include actual data retrieved from main memory that at least a processor 108 may need again soon. In one or more embodiments, cache entry may include a part of a program code, or any data generated or required by integrated software module 240 or host OS that has been accessed recently. In some cases, a cache entry may include an address tag which is used to identify which data from main memory 112 is currently stored in the cache entry. As a nonlimiting example, when at least a processor 108 searches for data, it may be configured to check address tag to determine if the data is present in cache. In some cases, one or more control bits (i.e., flags that provide additional information about cache entry) such as without limitation whether data has been modified (i.e., dirty bit), whether the data is valid (i.e., valid bit), or if it has been recently accessed (e.g., used for replacement polices like Least Recently Used [LRU]). As a nonlimiting example, after second partition 132b's dedicated execution time slice 228 concludes, cache entries that may be used by second partition 132b may be cleared, ensuring any sensitive data is no longer accessible to any other partitions 132a-n or entity that may access same CPU core and cache thereafter. In some cases, at least a processor 108 may be configured to invalidate (i.e., clear) cache entries at the end of dedicated time slice 228. In some cases, invalidating one or more cache entries may include marking control bit of the cache entries as "invalid", so any subsequent attempts to access cache entries will result in a cache miss, preventing unauthorized access from other partitions 132a-n outside the process. As a nonlimiting example, once a critical navigation calculation is over, temporary computation results may be stored in cache. At least a processor 108 may be configured to ensure that such computation results can't be accessed by a third-party entity or other partitions 132a-n. Once an aircraft lands at its destination, cache entries may be automatically invalidated, returning cache to a clean state with no residual data from flight management system left.

Figures 3A, 3B:
FIGS. 3A-B are block diagrams illustrating exemplary partitioning designs pertaining to the apparatus in FIG. 1.

Now referring to FIGS. 3A-B, exemplary partitioning designs 300a-b pertaining to apparatus 100 are illustrated. FIG. 3A illustrates a first partitioning design 300a, wherein an operating system 304a may sit atop the physical hardware of a computing device. In one or more embodiments, first operating system 304a may provide the means to partition and/or allocate memory within an operating system for use in one or more virtual machines. In one or more embodiments, first partitioning design 300a may allow for a single operating system to manage one or more partitions. In one or more embodiments, virtual machines with first partitioning design 300a must rely on the dependability of host operating system 304a. In one or more embodiments, a type 2 hypervisor, as described above, may be used to create one or more virtual machines atop operation system 304a. FIG. 3B illustrates a first partitioning design 300b, wherein one or more operating systems may communicate directly with physical hardware. In contrast to first partitioning design 300a wherein one or more virtual machines must communicate with host operating system 304a to receive resources, second partitioning design 300b includes one or more virtual machines that communicate directly with the physical hardware of a computing device. In one or more embodiments, a kernel 304b may allocate resources to each operating system. In one or more embodiments, a kernel 304b may create a virtualization layer, as described above, to generate virtualized devices and allocate the virtualized devices to each operating system. In one or more embodiments, a partition created using second partition design 300b may be independent of other operating systems operating on the computing device.

With continued reference to FIGS. 3A-B, in one or more embodiments, apparatus 100 may employ an approach of partitioning above a minimal kernel 304b, as shown in FIG. 3B, second partition design 300b. For the purposes of this disclosure, a "minimal kernel" is a core subset of an OS that provides only the most essential services required for basic operation. In some cases, minimal kernel 304b may be lightweight. As a nonlimiting example, minimal kernel 304b may be designed to have a minimal attack surface and reduced potential for bugs and errors. In some cases, at least processor 108 may be configured to create one or more isolated partitions e.g., first partition 132a, second partition 132b, third partition 132c, and/or virtual environment 128, on top of, or using the services of, minimal kernel 304b. As a nonlimiting example, one or more software applications and/or tasks (i.e., second partition 132b) may be partitioned according to partitioning designs 300a-b to ensure that these software applications and/or tasks do not interfere with each other, especially if they have different safety or security requirements. In some cases, when partitioning is done "above minimal kernel", each partition 132a-n of plurality of partitions 132a-n may run under a corresponding OS 308a-c, wherein each OS may be provided separately in each partition 132a-n. In these cases, plurality of partitions 132a-n may rely only on kernel 304b and its supporting hardware 312. Plurality of partitions 132a-n and their corresponding OS 308a-c may be separated by hypervisor 148 in consistent with SCOE design patterns as described above with reference to FIGS. 1-2. Each partition 132a-n of plurality of partitions 132a-n may have the ability to run a completely independent instance of an OS.

Figure 4:
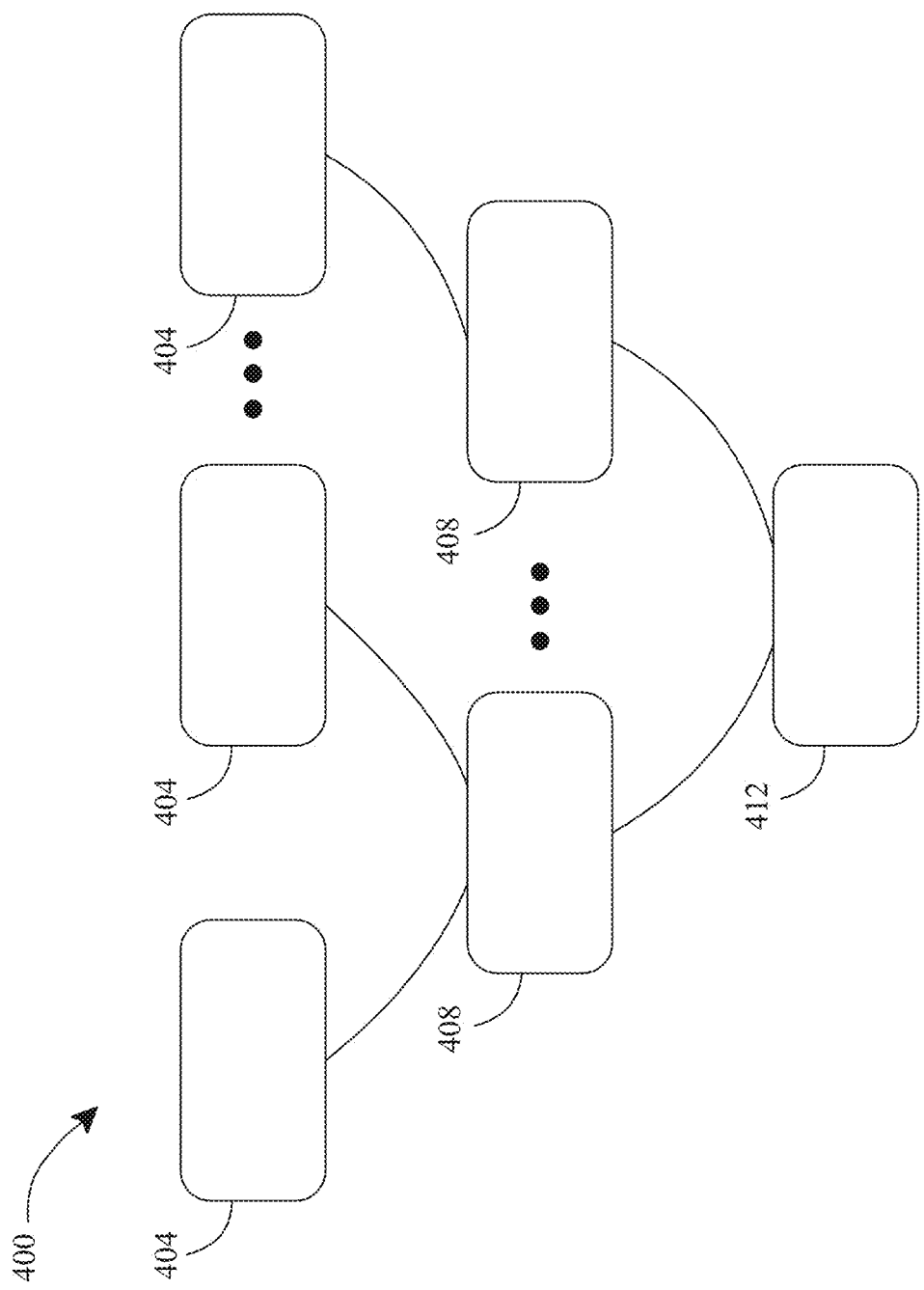
FIG. 4 illustrates an exemplary embodiment of a cryptographic accumulator.

Referring now to FIG. 4, an exemplary embodiment of a cryptographic accumulator 400 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 400 has a plurality of accumulated elements 404, each accumulated element 404 generated from a lot of the plurality of data lots. Accumulated elements 404 are created using an encryption process, defined for this purpose as a process that renders the lots of data unintelligible from the accumulated elements 404; this may be a one-way process such as a cryptographic hashing process and/or a reversible process such as encryption. Cryptographic accumulator 400 further includes structures and/or processes for conversion of accumulated elements 404 to root 412 element. For instance, and as illustrated for exemplary purposes in FIG. 4, cryptographic accumulator 400 may be implemented as a Merkle tree and/or hash tree, in which each accumulated element 404 created by cryptographically hashing a lot of data. Two or more accumulated elements 404 may be hashed together in a further cryptographic hashing process to produce a node 408 element; a plurality of node 408 elements may be hashed together to form parent nodes 408, and ultimately a set of nodes 408 may be combined and cryptographically hashed to form root 412. Contents of root 412 may thus be determined by contents of nodes 408 used to generate root 412, and consequently by contents of accumulated elements 404, which are determined by contents of lots used to generate accumulated elements 404. As a result of collision resistance and avalanche effects of hashing algorithms, any change in any lot, accumulated element 404, and/or node 408 is virtually certain to cause a change in root 412; thus, it may be computationally infeasible to modify any element of Merkle and/or hash tree without the modification being detectable as generating a different root 412. In an embodiment, any accumulated element 404 and/or all intervening nodes 208 between accumulated element 404 and root 412 may be made available without revealing anything about a lot of data used to generate accumulated element 404; lot of data may be kept secret and/or demonstrated with a secure proof as described below, preventing any unauthorized party from acquiring data in lot.

Alternatively, or additionally, and still referring to FIG. 4, cryptographic accumulator 400 may include a "vector commitment" which may act as an accumulator in which an order of elements in set is preserved in its root 412 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 400 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be bashed and grouped together. Then, the hashes of those groups may be bashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 5:
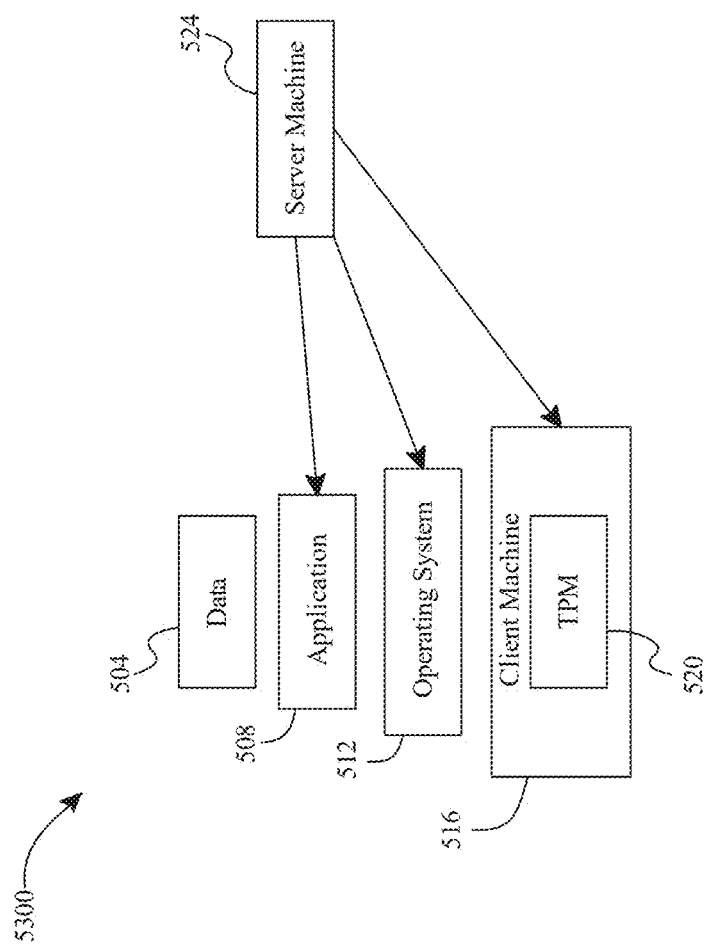
FIG. 5 is an exemplary embodiment of a system for a trusted computing architecture.

Referring now to FIG. 5, an exemplary embodiment of a system 500 for a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, trusted computing may which system 512 and application 508 perform one or more actions, determinations, calculations, or the like as described in this disclosure. Trusted computing may also enable integrated data privacy involving NFTs in the launching of the NFTs onto a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data 304, and other system state information, and remote attestation configured to allow a trusted device to present reliable evidence to remote parties about the software it is running.

In a non-limiting embodiment, and still referring to FIG. 5, trusted computing may include a secure coprocessor and/or cryptoprocessor such as without limitation a Trusted Platform Module (TPM) 520. A "Trusted Platform Module," as used in this disclosure, is a tamper resistant piece of cryptographic hardware built onto a system board or other hardware that implements primitive cryptographic functions on which more complex features can be built. A client machine 516 may be integrated with TPM 520 architecture which a server machine 524 may verify. In a non-limiting embodiment, client machine 516 may be consistent with a computing device as described in the entirety of this disclosure. In another non-limiting embodiment, client machine 516 may be consistent with system 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data 504, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 524 such as a certification authority (CA).

In a non-limiting embodiment and still referring to FIG. 5, a TPM may perform an integrity measurement to enable a user and/or process access to private data 504. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example, and without limitation, at load-time, TPM may use a hash function to fingerprint an executable, an executable plus its input data 504, or a sequence of such files. These hash values may be used in attestation to reliably establish code identity to remote or local verifiers such as server machine 524. Hash values can also be used in conjunction with a sealed storage feature. A secret may be sealed along with a list of hash values of programs that are allowed to unseal the secret. This may allow creation of data files that can only be opened by specific applications.

With continued reference to FIG. 5, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data 504 is accurate because it is signed by TPM 520 whose key may be certified by a CA. Attestation may include a remote attestation. A "remote attestation," as used in this disclosure, is method by which a host (client) authenticates its hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 520 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

Figure 6:
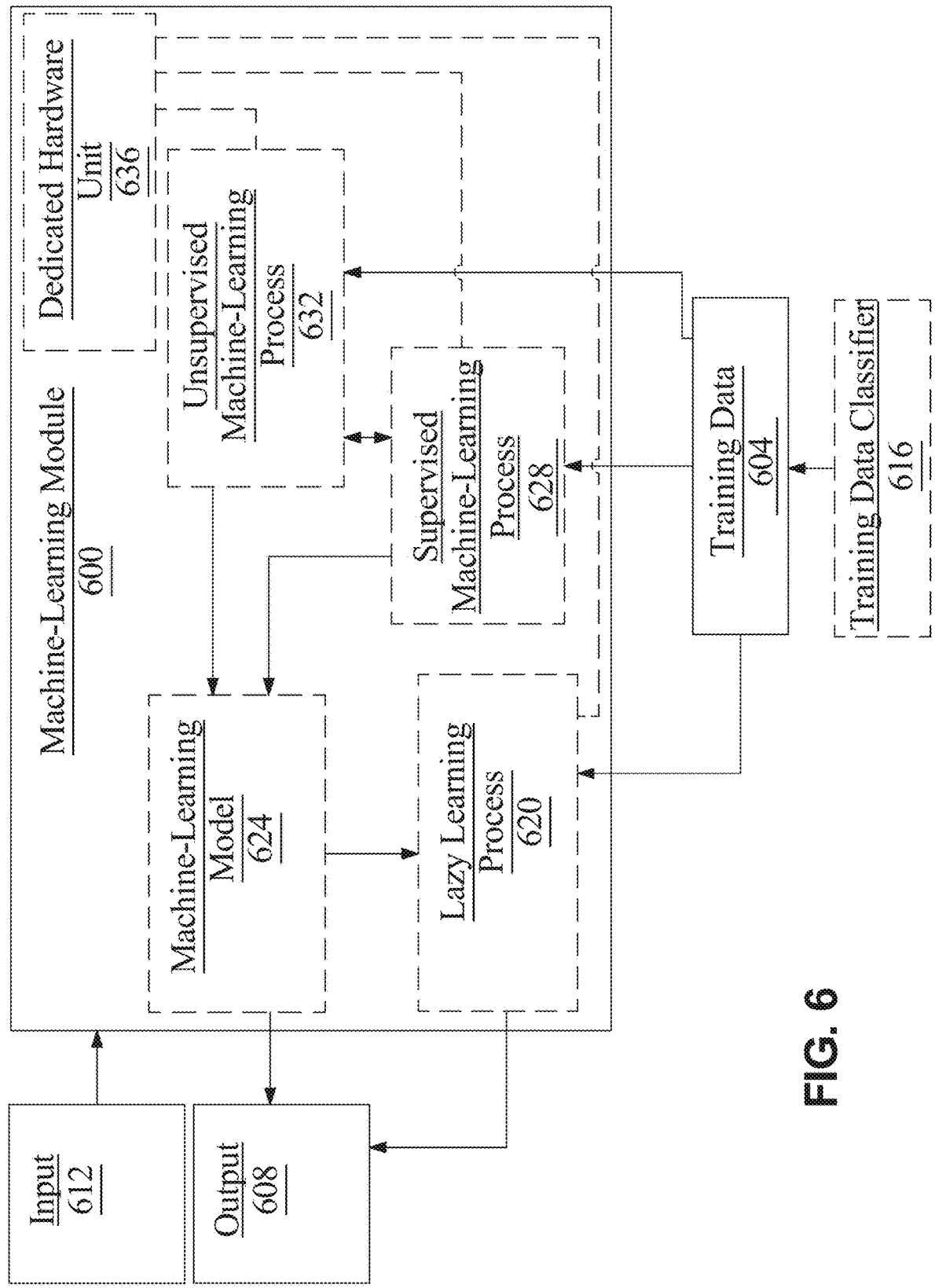
FIG. 6 is a block diagram of an exemplary machine-learning process.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include inputs such as source nodes, destination nodes, update data and/or any other inputs as described above, and outputs may include transmission paths 144.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a process whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to particular network channels wherein each training data set may be classified to a particular network. For example, and without limitation, a first training data set may be classified to cellular networks whereas a second training data set may be classified to satellite networks.

Still referring to FIG. 6, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 6, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 6, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down sampling on data. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 6, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 6, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 6, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as source nodes, destination nodes, operating environments, a location of system 100 and the like as described above as described above as inputs, transmission paths 144 as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 632 may not require a response variable; unsupervised processes 632 may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithms may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
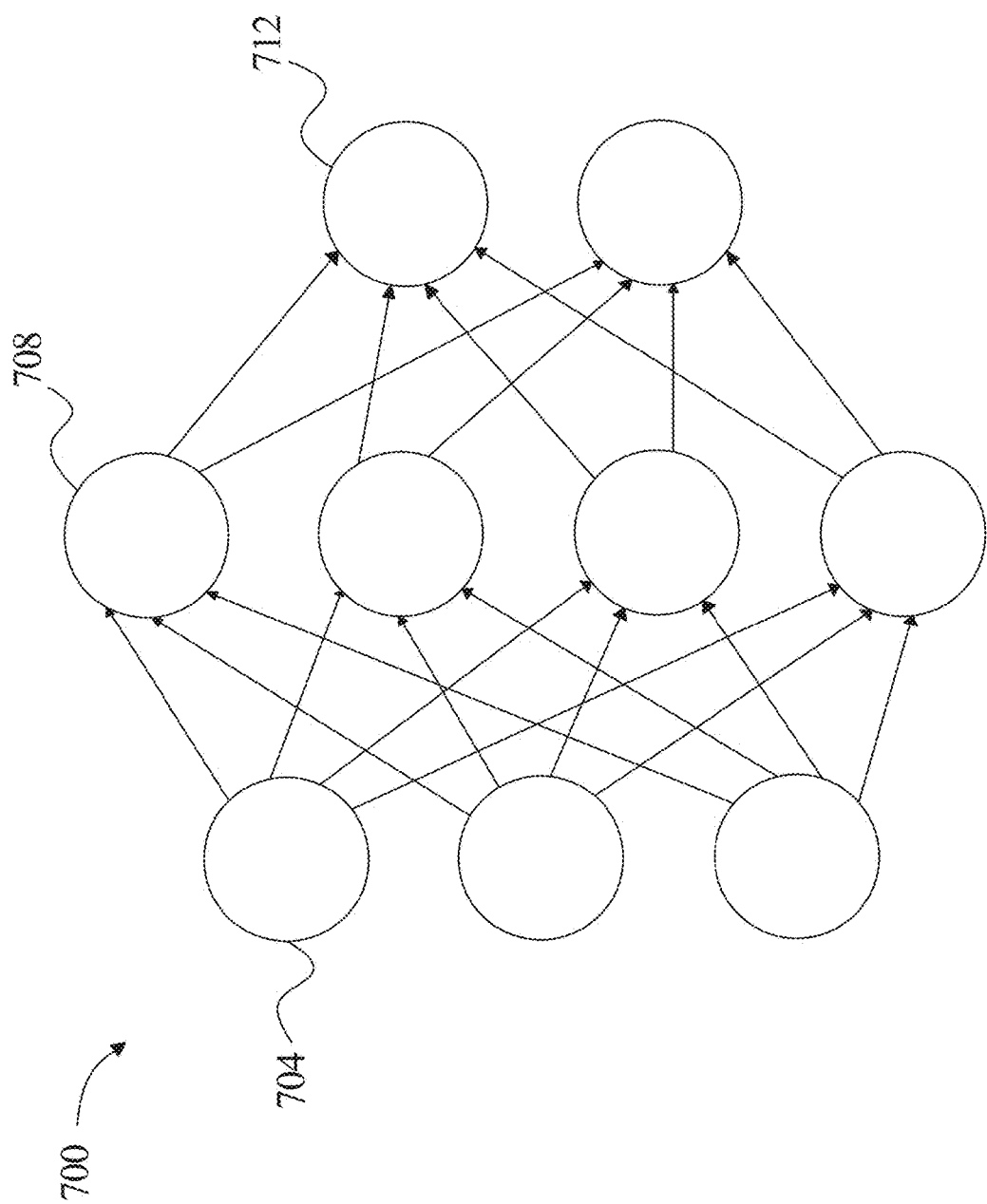
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
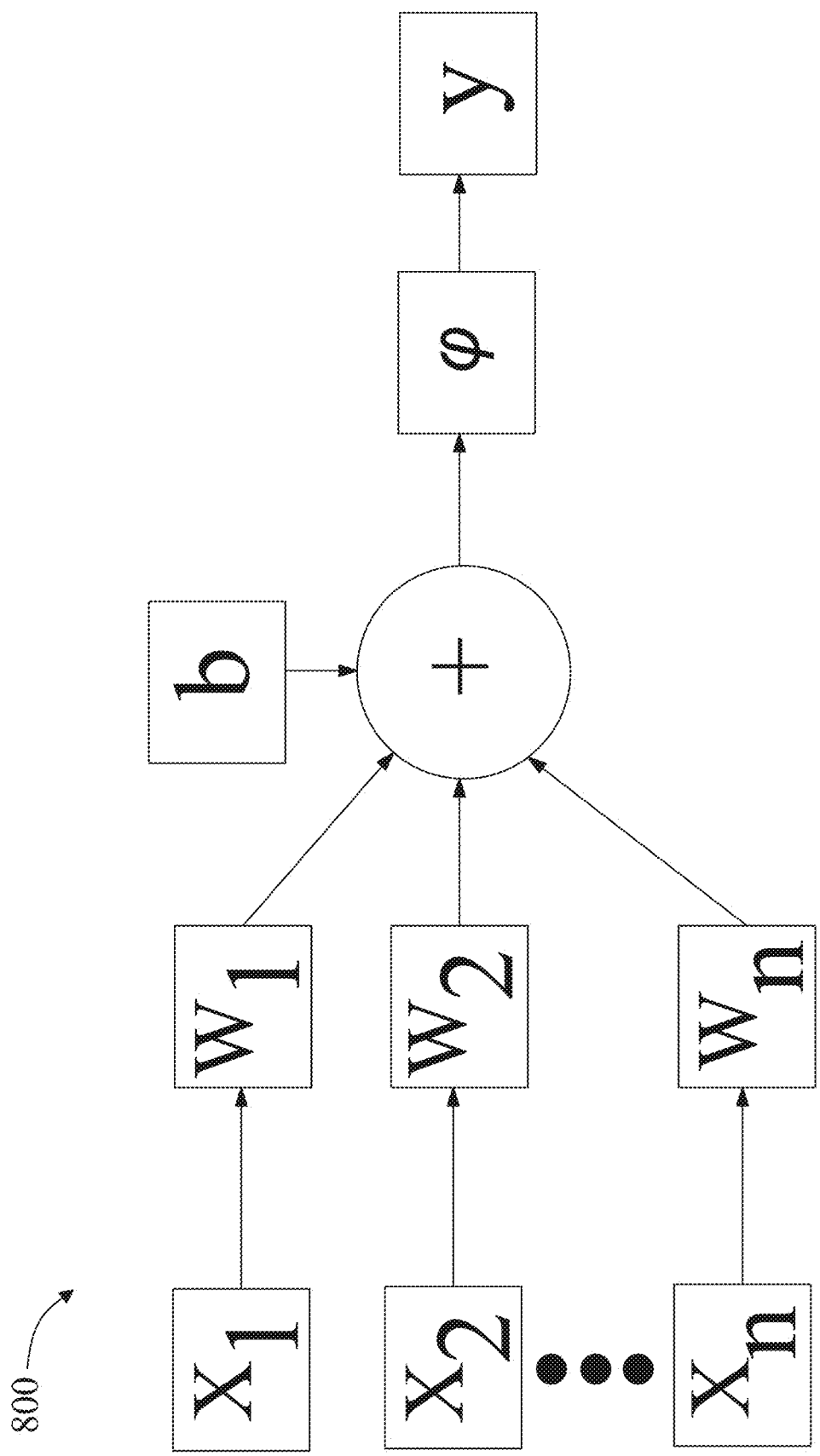
FIG. 8 is a diagram of an exemplary embodiment of a node of a neural network.

Referring now to FIG. 8, an exemplary embodiment of a node 800 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x - e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w; that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
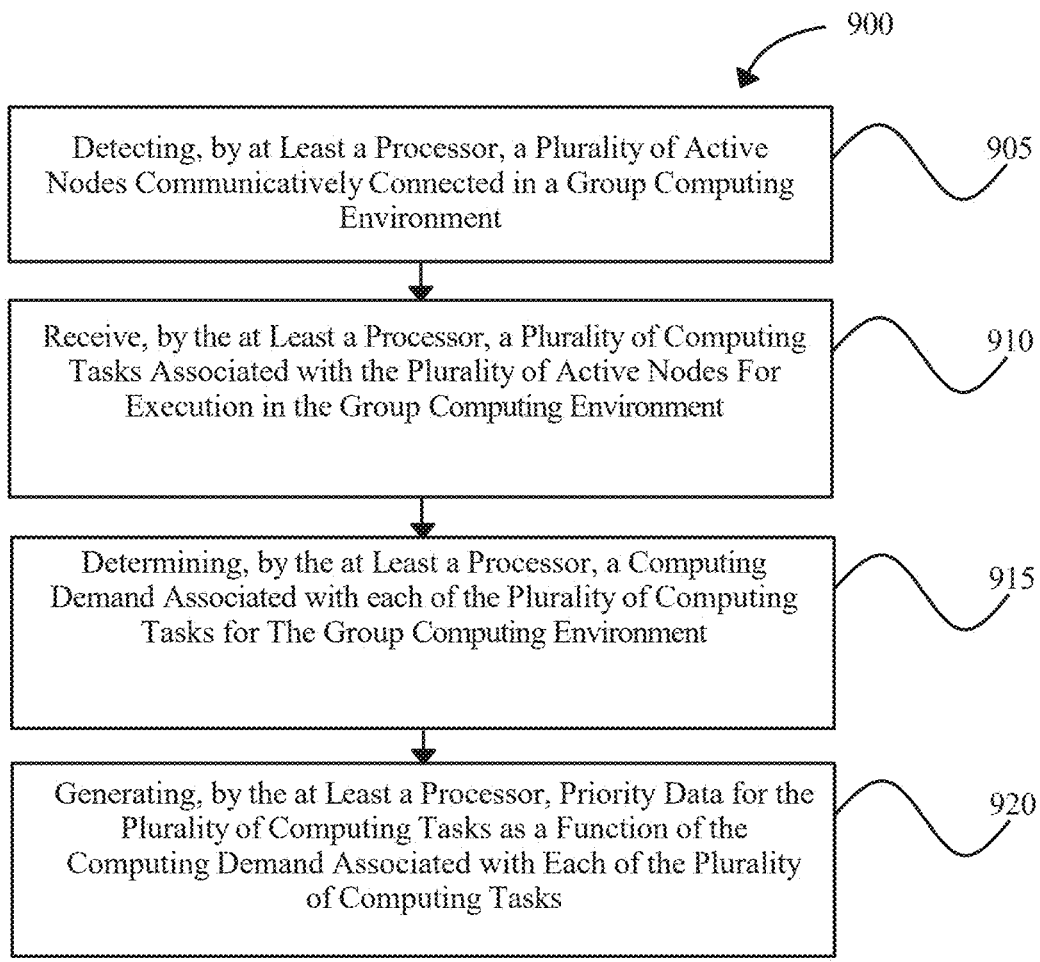
FIG. 9 is a flow diagram illustrating an exemplary embodiment of a method for prioritization of group computing tasks.

Referring now to FIG. 9, a method 900 for prioritization of group computing tasks is described. At step 905, method 900 includes detecting, by at least a processor, a plurality of active nodes communicatively connected in a group computing environment. This may be implemented with reference to FIGS. 1-8 and without limitation.

With continued reference to FIG. 9, at step 910, method 900 includes receiving, by the at least a processor, a plurality of computing tasks associated with the plurality of active nodes. This may be implemented with reference to FIGS. 1-8 and without limitation.

With continued reference to FIG. 9, at step 915, method 900 includes determining, by the at least a processor, a computing demand associated with each of the plurality of computing tasks in the group computing environment. This may be implemented with reference to FIGS. 1-8 and without limitation.

With continued reference to FIG. 9, at step 920, method 900 includes generating, by the at least a processor, priority data for the plurality of computing tasks as a function of the computing demand associated with each of the plurality of computing tasks. This may be implemented with reference to FIGS. 1-8 and without limitation.

With further reference to FIG. 9, method 900 may include determining, by the at least a processor, a criticality factor for each of the plurality of computing tasks. Further, additionally, or alternatively, determining the criticality factor for each of the plurality of computing tasks may comprise receiving criticality training data comprising a plurality of exemplary computing task inputs correlated to a plurality of criticality factor outputs. Additionally, or alternatively, determining the criticality factor for each of the plurality of computing tasks may comprise training a criticality machine learning model as a function of the criticality training data. In an embodiment, training the criticality machine learning model as a function of the criticality training data may comprise receiving priority feedback following each complete iteration of processing of the system. Further additionally, or alternatively, training the criticality machine learning model as a function of the criticality training data may comprise iteratively training the criticality machine learning model as a function of the priority feedback. Further, additionally, or alternatively, determining the criticality factor for each of the plurality of computing tasks may comprise determining the criticality factor for each of the plurality of computing tasks as a function of the trained criticality machine learning model. In an embodiment, generating the priority data for the plurality of computing tasks further comprises generating the priority data as a function of the criticality factor for each of the plurality of computing tasks. This may be implemented with reference to FIGS. 1-8 and without limitation.

With further reference to FIG. 9, method 900 may include determining, by the at least a processor, a security factor for each of the plurality of computing tasks. Further, additionally, or alternatively, determining the security factor for each of the plurality of computing tasks may comprise receiving security factor training data comprising a plurality of exemplary computing task inputs correlated to a plurality of security factor outputs. Additionally, or alternatively, determining the security factor for each of the plurality of computing tasks may comprise training a security factor machine learning model as a function of the security factor training data. In an embodiment, training the security factor machine learning model as a function of the security factor training data may comprise receiving priority feedback following each complete execution of the plurality of computing tasks. Further additionally, or alternatively, training the security factor machine learning model as a function of the security factor training data may comprise iteratively training the security factor machine learning model as a function of the priority feedback. Further, additionally, or alternatively, determining the security factor for each of the plurality of computing tasks may comprise determining the security factor for each of the plurality of computing tasks as a function of the trained criticality machine learning model. In an embodiment, generating the priority data for the plurality of computing tasks further comprises generating the priority data as a function of the security factor for each of the plurality of computing tasks. This may be implemented with reference to FIGS. 1-8 and without limitation.

With further reference to FIG. 9, method 900 may include communicating, by the at least a processor, the priority for the plurality of computing tasks to the plurality of active nodes. This may be implemented with reference to FIGS. 1-8 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
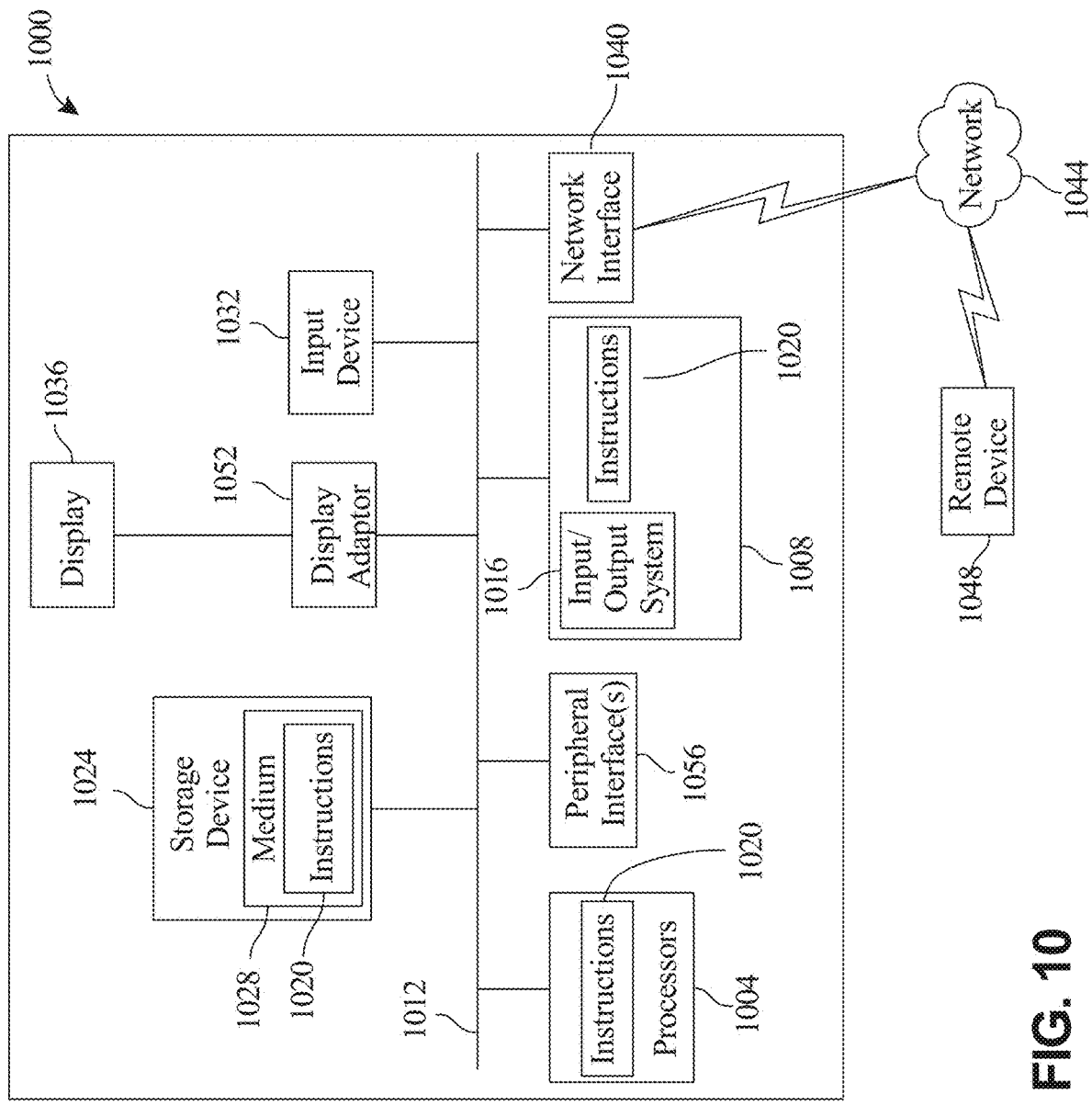
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for prioritization of group computing tasks, the system comprising:
   at least a processor; and
   a memory communicatively connected to the at least a processor, the memory containing instructions configuring the at least a processor to:
   detect a plurality of active nodes communicatively connected in a group computing environment, wherein the group computing environment comprises a virtual environment using at least a secondary computing device, as a function of hardware allocation;
   receive a plurality of computing tasks associated with the plurality of active nodes for execution in the group computing environment;
   train a demand machine-learning model using demand training data, wherein training the demand machine-learning model comprises:
   obtaining the demand training data by querying a communicatively connected database, wherein the communicatively connected database comprises past inputs and outputs of the demand machine-learning model;
   training the demand machine-learning model as a function of the demand training data;
   receiving demand feedback as a function of user input associated with an accuracy of an output of the trained demand machine-learning model;
   retraining the demand machine-learning model as a function of the user input;
   determine a computing demand associated with each of the plurality of computing tasks for the group computing environment using the retrained demand machine-learning model; and
   generate priority data for the plurality of computing tasks as a function of the computing demand associated with each of the plurality of computing tasks, wherein generating the priority data comprises utilizing a secure proof protocol, wherein the secure proof protocol comprises a zero-knowledge proof.

2. The system of claim 1, wherein the at least a processor is further configured to determine a criticality factor for each of the plurality of computing tasks.

3. The system of claim 2, wherein determining the criticality factor for each of the plurality of computing tasks comprises:
   receiving criticality training data comprising a plurality of exemplary computing task inputs correlated to a plurality of criticality factor outputs;
   training a criticality machine learning model as a function of the criticality training data; and
   determining the criticality factor for each of the plurality of computing tasks as a function of the trained criticality machine learning model.

4. The system of claim 3, wherein training the criticality machine learning model as a function of the criticality training data comprises:
   receiving priority feedback following each complete iteration of processing of the system; and
   iteratively training the criticality machine learning model as a function of the priority feedback.

5. The system of claim 4, wherein generating the priority data for the plurality of computing tasks further comprises generating the priority data as a function of the criticality factor for each of the plurality of computing tasks.

6. The system of claim 1, wherein the at least a processor is further configured to determine a security factor for each of the plurality of computing tasks.

7. The system of claim 6, wherein determining the security factor for each of the plurality of computing tasks comprises:
   receiving security factor training data comprising a plurality of exemplary computing task inputs correlated to a plurality of security factor outputs;
   training a security factor machine learning model as a function of the security factor training data; and
   determining the security factor for each of the plurality of computing tasks as a function of the trained security factor machine learning model.

8. The system of claim 7, wherein training the security factor machine learning model as a function of the security factor training data comprises:
   receiving priority feedback following each complete iteration of execution of the plurality of computing tasks; and iteratively training the security factor security factor machine learning model as a function of the priority feedback.

9. The system of claim 8, wherein generating the priority data for the plurality of computing tasks further comprises generating the priority data as a function of the security factor for each of the plurality of computing tasks.

10. The system of claim 1, wherein the at least a processor is further configured to communicate the priority data for the plurality of computing tasks to the plurality of active nodes.

11. A method for prioritization of group computing tasks comprising:
  detecting, by at least a processor, a plurality of active nodes communicatively connected in a group computing environment, wherein the group computing environment comprises a virtual environment using at least a secondary computing device, as a function of hardware allocation;
  receiving, by the at least a processor, a plurality of computing tasks associated with the plurality of active nodes for execution in the group computing environment;
  training, by the at least a processor, a demand machine-learning model using demand training data, wherein training the demand machine-learning model comprises:
    obtaining the demand training data by querying a communicatively connected database, wherein the communicatively connected database comprises past inputs and outputs of the demand machine-learning model;
    training the demand machine-learning model as a function of the demand training data;
    receiving demand feedback as a function of user input associated with an accuracy of an output of the trained demand machine-learning model;
    retraining the demand machine-learning model as a function of the user input;
  determining, by the at least a processor, a computing demand associated with each of the plurality of computing tasks for the group computing environment using the retrained demand machine-learning model; and
  generating, by the at least a processor, priority data for the plurality of computing tasks as a function of the computing demand associated with each of the plurality of computing tasks, wherein generating the priority data comprises utilizing a secure proof protocol, wherein the secure proof protocol comprises a zero-knowledge proof.

12. The method of claim 11, further comprising determining, by the at least a processor, a criticality factor for each of the plurality of computing tasks.

13. The method of claim 12, wherein determining the criticality factor for each of the plurality of computing tasks comprises:
  receiving criticality training data comprising a plurality of exemplary computing task inputs correlated to a plurality of criticality factor outputs;
  training a criticality machine learning model as a function of the criticality training data; and
  determining the criticality factor for each of the plurality of computing tasks as a function of the trained criticality machine learning model.

14. The method of claim 13, wherein training the criticality machine learning model as a function of the criticality training data comprises:
  receiving priority feedback following each complete iteration of processing of the method; and
  iteratively training the criticality machine learning model as a function of the priority feedback.

15. The method of claim 14, wherein generating the priority data for the plurality of computing tasks further comprises generating the priority data as a function of the criticality factor for each of the plurality of computing tasks.

16. The method of claim 11, wherein the method further comprises determining, by the at least a processor, a security factor for each of the plurality of computing tasks.

17. The method of claim 16, wherein determining the security factor for each of the plurality of computing tasks comprises:
  receiving security factor training data comprising a plurality of exemplary computing task inputs correlated to a plurality of security factor outputs;
  training a security factor machine learning model as a function of the security factor training data; and
  determining the security factor for each of the plurality of computing tasks as a function of the trained security factor machine learning model.

18. The method of claim 17, wherein training the security factor machine learning model as a function of the security factor training data comprises:
  receiving priority feedback following each complete iteration of execution of the plurality of computing tasks; and
  iteratively training the security factor machine learning model as a function of the priority feedback.

19. The method of claim 18, wherein generating the priority data for the plurality of computing tasks further comprises generating the priority data as a function of the security factor for each of the plurality of computing tasks.

20. The method of claim 11, further comprising communicating, by the at least a processor, the priority data for the plurality of computing tasks to the plurality of active nodes.

* * * * *